United States Patent
Shibata et al.

(10) Patent No.: US 9,866,327 B2
(45) Date of Patent: Jan. 9, 2018

(54) DISTRIBUTED RADIO COMMUNICATION BASE STATION SYSTEM, BASE BAND UNIT, REMOTE RADIO UNIT, AND METHOD FOR OPERATING DISTRIBUTED RADIO COMMUNICATION BASE STATION SYSTEM

(71) Applicant: NIPPON TELEGRAPH AND TELEPHONE CORPORATION, Tokyo (JP)

(72) Inventors: Naotaka Shibata, Yokosuka (JP); Seiji Yoshida, Yokosuka (JP); Shigeru Kuwano, Yokohama (JP); Jun-ichi Kani, Yokosuka (JP); Jun Terada, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/424,342

(22) PCT Filed: Oct. 10, 2013

(86) PCT No.: PCT/JP2013/077611
§ 371 (c)(1),
(2) Date: Feb. 26, 2015

(87) PCT Pub. No.: WO2014/061552
PCT Pub. Date: Apr. 24, 2014

(65) Prior Publication Data
US 2015/0229397 A1    Aug. 13, 2015

(30) Foreign Application Priority Data

Oct. 19, 2012  (JP) ................................ 2012-231548
Nov. 2, 2012   (JP) ................................ 2012-242491
Nov. 9, 2012   (JP) ................................ 2012-247260

(51) Int. Cl.
*H04B 10/2575* (2013.01)
*H04W 88/08* (2009.01)

(52) U.S. Cl.
CPC . *H04B 10/25753* (2013.01); *H04B 10/25754* (2013.01); *H04B 10/25759* (2013.01); *H04W 88/08* (2013.01)

(58) Field of Classification Search
None
See application file for complete search history.

(56) References Cited

U.S. PATENT DOCUMENTS

2006/0088125 A1* 4/2006 Miyatani ............... H04L 5/06
375/296
2011/0223958 A1* 9/2011 Chen ..................... H04B 7/022
455/522

FOREIGN PATENT DOCUMENTS

JP    2007221688    8/2007
JP    2009296335    12/2009
(Continued)

OTHER PUBLICATIONS

CPRI, "CPRI Specification v5.0," Sep. 2011, http://www.cpri.info/spec.html.
(Continued)

*Primary Examiner* — Darren E Wolf
(74) *Attorney, Agent, or Firm* — Ohlandt, Greeley, Ruggiero & Perle, L.L.P.

(57) ABSTRACT

Since a sampling frequency of RRU is always constant, A/D conversion may be performed with a sampling frequency higher than necessary with respect to a frequency band width of a radio signal.
A sampling frequency change function, and the sampling frequency is reduced in a range where a aliasing component does not deteriorate signal quality of a desired signal component when the sampling frequency is decreased, based on
(Continued)

radio band allocation information, or signal transmission between BBU and RRU is stopped in a no signal section, whereby a band required for digital RoF transmission between the BBU and the RRU is reduced.

21 Claims, 33 Drawing Sheets

(56) References Cited

FOREIGN PATENT DOCUMENTS

| | | |
|---|---|---|
| JP | 2011234088 | 11/2011 |
| JP | 2012074866 | 4/2012 |

OTHER PUBLICATIONS

3GPP TS 36.104 V10.4.0, "Evolved Universal Terrestrial Radio Access (E-ULTRA) ; Base Station (BS) radio transmission and reception", p. 28 (Sep. 2011).

International Search Report dated Jan. 7, 2014 dated corresponding to PCT/JP2013/077611; 2 pages.

International Preliminary Report on Patentability dated Apr. 30, 2015 corresponding to International Patent Application No. PCT/JP2013/077611, 7 pages.

* cited by examiner

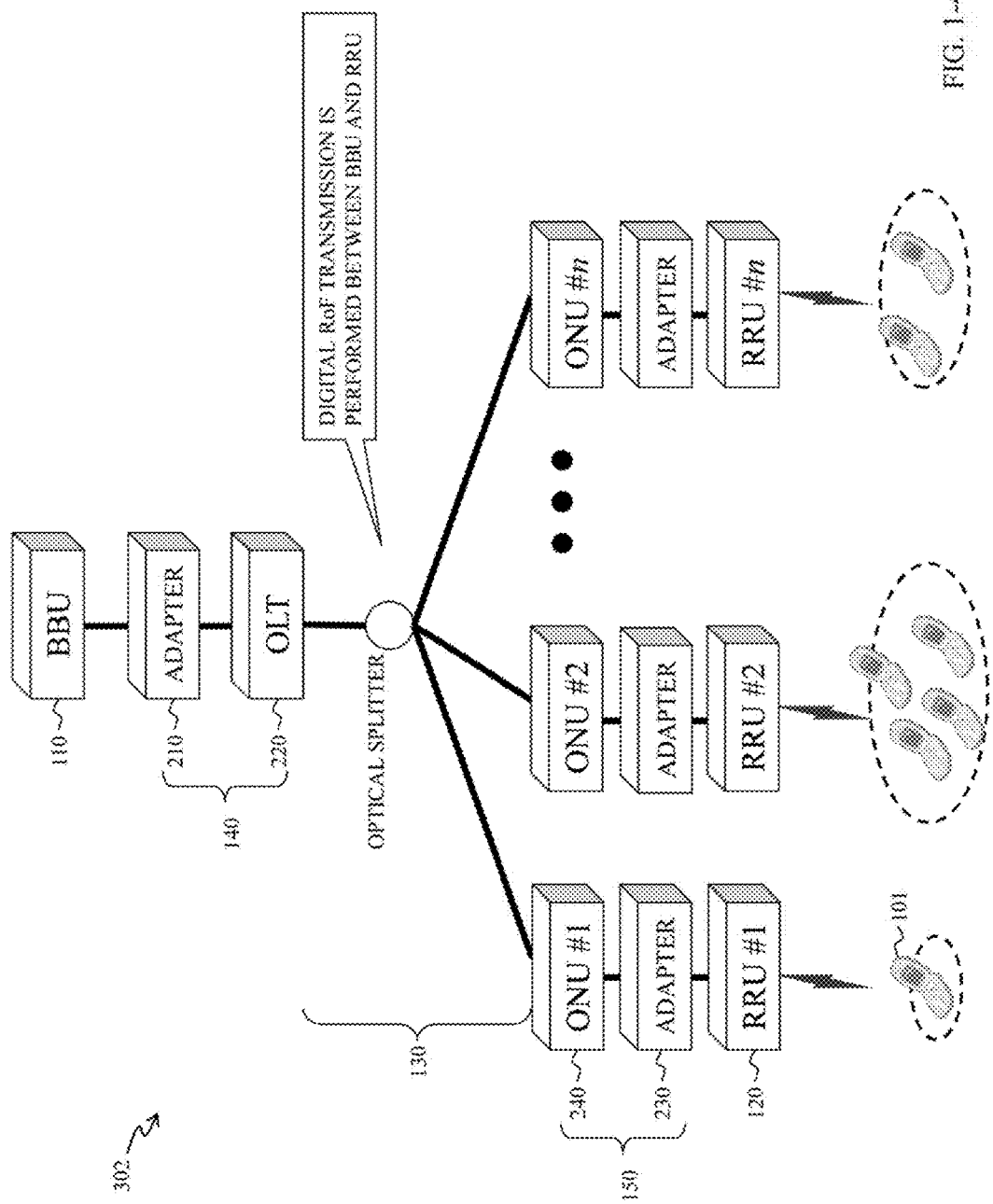

DETERMINATION TABLE OF SAMPLING FREQUENCY

| RANGE OF ALLOCATED BAND $f$ | SAMPLING FREQUENCY |
|---|---|
| $f_{sys,2} < f < f_{sys,1}$ | $f_{s,1}$ |
| $f_{sys,3} < f < f_{sys,2}$ | $f_{s,2}$ |
| $f_{sys,4} < f < f_{sys,3}$ | $f_{s,3}$ |
| $f < f_{sys,4}$ | $f_{s,4}$ |

FIG. 2-4

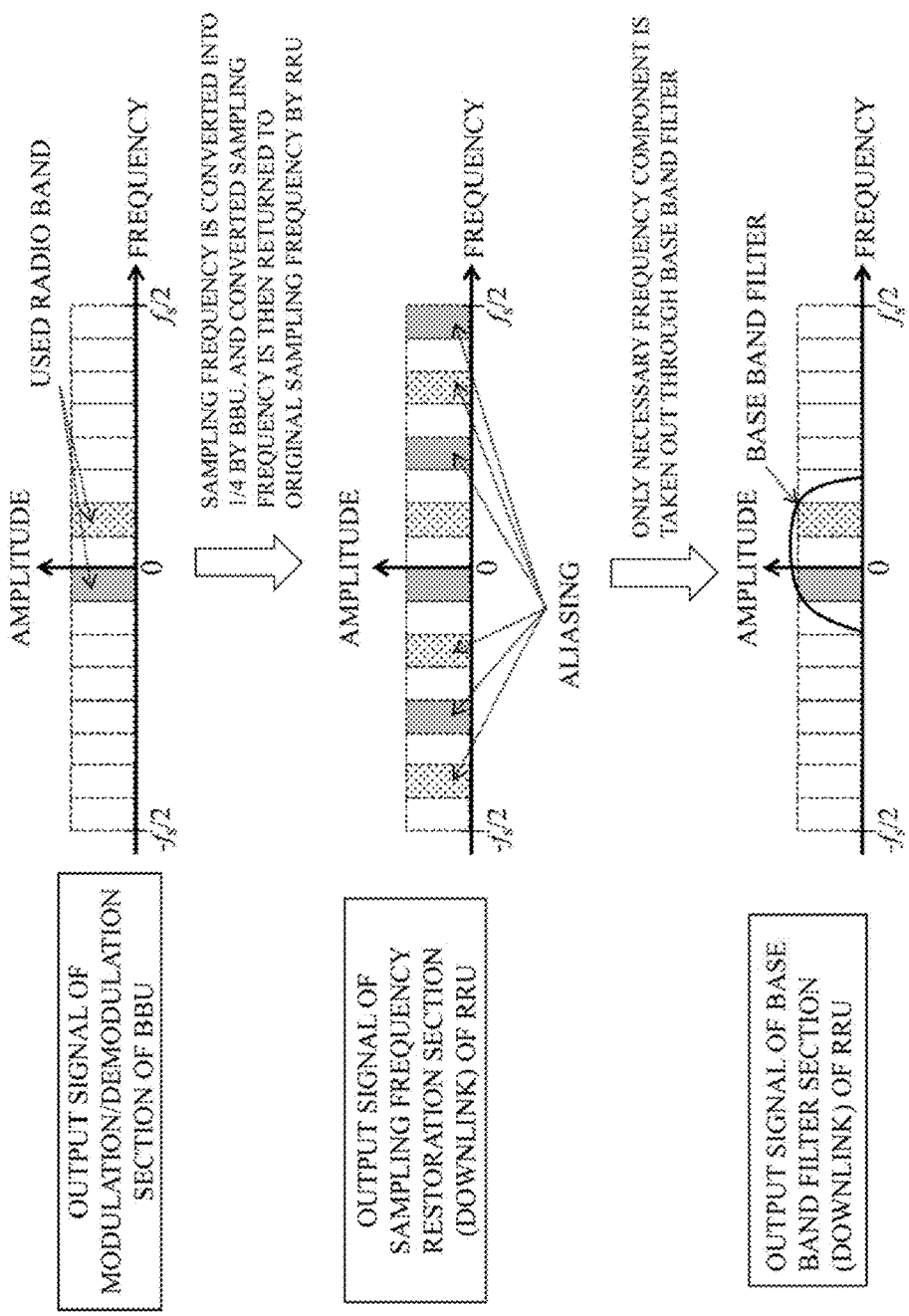

| CANDIDATES OF SAMPLING FREQUENCY |
|---|
| SAMPLING FREQUENCY |
| $f_{s,1}$ |
| $f_{s,2}$ |
| $f_{s,3}$ |
| $f_{s,4}$ |

FIG. 2-12

DISTRIBUTED RADIO COMMUNICATION BASE STATION SYSTEM, BASE BAND UNIT, REMOTE RADIO UNIT, AND METHOD FOR OPERATING DISTRIBUTED RADIO COMMUNICATION BASE STATION SYSTEM

BACKGROUND

1. Field of the Disclosure

In a cellular system, in order to enhance the degree of freedom of cell configuration, it has been considered that the function of a base station is divided into a signal processing unit (BBU: Base Band Unit) and an RF unit (RRU: Remote Radio Unit) to achieve a physically separated configuration. In this case, a radio signal is transmitted between the BBU and the RRU by an RoF technique. Although the RoF technique can be broadly divided into an analog RoF technique and a digital RoF technique, recently, the digital RoF technique excellent in transmission quality has been actively studied, and use formulation has been progressed under a standards body such as CPRI (Common Public Radio Interface) (see, for example Non Patent Literature 1). As a transmission medium between the BBU and the RRU, although a coaxial cable, an optical fiber, or the like is used, particularly when the BBU and the RRU are connected through the optical fiber, a transmission distance can be dramatically extended.

The single BBU can store the plurality of RRUs, whereby the BBUs required for each of the RRUs can be aggregated into a single one, so that operation/installation cost can be reduced. As an example of such a form, as shown in FIG. 2-15, a form in which BBU 110 and RRU 120 are connected through PON (Passive Optical Network) is proposed. In this method, although a band between OLT (Optical Line Terminal) 140 and an optical splitter is fixed, a band between the optical splitter and ONU (Optical Network Unit) 150 can be changed according to a required band of the ONU 150. As a signal multiplexing method of the PON, TDM, WDM, FDM, or the like can be employed. The application area of the present disclosure is not limited to FIG. 2-15, and the disclosure is applicable to a case in which the BBU 110 stores one or more RRUs 120.

The present disclosure relates to a required band reduction technique between the BBU 110 and the RRU 120.

2. Discussion of the Background Art

Hereinafter, a digital RoF transmission technique between the BBU 110 and the RRU 120 is referred to as a related technique. A link which converts a digital signal (IQ data) for each I axis and Q axis of a radio signal generated by the BBU 110 into an optical signal, transmits the optical signal to the RRU 120, converts the optical signal received by the RRU 120 into a radio signal, and transmits the radio signal to a terminal is referred to as a downlink. Meanwhile, a link which receives a radio modulation signal transmitted from a terminal in the RRU 120, converts the received radio signal into an optical signal, transmits the optical signal to the BBU 110, converts the optical signal received by the BBU 110 into IQ data, and demodulates a signal is referred to as an uplink.

A device configuration example of RRU related to the present disclosure is shown in FIG. 2-16.

For uplink signal processing, the RRU 120 has an antenna 11 which transmits/receives a radio signal, a transmission/reception switching section 12 which switches transmission/reception, an amplifier 21 which amplifies a signal power of a received radio signal to a level capable of signal processing, a down-conversion section 22 which down-converts a radio signal, an A/D conversion section 23 which converts a down-converted analog signal into IQ data, a base band filter section (uplink) 24 which applies filtering processing to the IQ data, a frame conversion section 25 which multiplexes the IQ data and a control signal, and an E/O conversion section 26 which converts an electrical signal into an optical signal and transmits the optical signal. The transmission/reception switching section 12 can correspond to both FDD (Frequency Division Duplex) and TDD (Time Division Duplex).

Meanwhile, for downlink signal processing, the RRU 120 has an O/E conversion section 31 which converts an optical signal received from the BBU 110 into an electrical signal, a frame conversion section 32 which takes out a control signal and IQ data from a received signal, a base band filter section (downlink) 33 which applies filtering processing to the IQ data, a D/A conversion section 34 which converts the IQ data into an analog signal, an up-conversion section 35 which up-converts an analog signal, an amplifier 36 which amplifies electric power to a given transmitted power, the transmission/reception switching section 12, and the antenna 11.

A device configuration example of the BBU related to the present disclosure is shown in FIG. 2-17.

For the uplink signal processing, the BBU 110 has an O/E conversion section 41 which converts an optical signal into an electrical signal, a frame conversion section 42 which takes out a control signal and IQ data from a received signal, and a modulation/demodulation section 43 which demodulates the IQ data.

Meanwhile, for the downlink signal processing, the BBU 110 has the modulation/demodulation section 43 which outputs the IQ data of a radio modulation signal, a frame conversion section 51 which multiplexes the IQ data and a control signal, an E/O conversion section 52 which converts an electrical signal into an optical signal and transmits the optical signal, and a control signal generation section 50 which generates the control single using a signal for synchronization and so on.

In cellular systems such as LTE (Long Term Evolution) and WiMAX (Worldwide Interoperability for Microwave Access), in order for a terminal to transmit and receive user data, a communication channel (radio band) specific to a terminal is required. The radio band is allocated by a base station. Taking an LTE system as an example, as shown in FIG. 2-18, a base station performs scheduling with a period of 1 ms at minimum and allocates the radio band to each terminal. In FIG. 2-18, white portions show unused resource blocks, and hatched portions show allocated resource blocks.

The allocation of the radio band is performed in the unit of resource block (RB), and 1 RB is 180 kHz and 0.5 ms. When a system band width is 20 MHz, 110 RBs exist on a frequency axis. In 1 RB, when a normal cyclic prefix is supposed, seven symbols (one symbol is 71.4 µs including the cyclic prefix) are inserted.

In the related technique, a sampling frequency $f_s$ used in the conversion of a radio modulation signal into a digital signal is determined by a system band width. Taking CPRI as an example, when the system band width of LTE is 20 MHz, $f_s$=30.72 MHz, and when the system band width is 10 MHz, $f_s$=15.36 MHz. As shown in FIG. 2-19, a sampling cycle Δs which is a time interval between signals obtained by quantizing radio signals is constant, and the sampling frequency $f_s$ is not changed according to time.

Taking a case, where an LTE (Long Term Evolution) signal is transmitted through CPRI, as an example, the sampling frequency of 30.72 MHz is used for a system having a system band width of 20 MHz. In digital sampling for each I axis and Q axis, a quantization bit number of 4 to 20 bits is applied to an uplink signal, and a quantization bit number of 8 to 20 bits is applied to a downlink signal. In the frame conversion section, a control signal is inserted into 1/16 of the entire frame, and the signal is transmitted after 8 B/10 B encoding.

Meanwhile, in the cellular systems such as LTE and WiMAX (Worldwide Interoperability for Microwave Access), in order for a terminal to transmit and receive user data, a communication channel (radio band) specific to a terminal is required. The radio band is allocated by a base station.

Taking the LTE system as an example, as shown in FIG. 2-18, the base station performs scheduling with a period of 1 ms at minimum and allocates the radio band to each terminal. The radio band allocation is performed in the unit of resource block (RB), and 1 RB is constituted of a frequency domain of 180 kHz and a time domain of 0.5 ms. When the system band width is 20 MHz, 110 RBs exist on the frequency axis. In 1 RB, when the normal cyclic prefix is supposed, seven symbols (one symbol is 71.4 μs, including the cyclic prefix) are inserted.

CITATION LIST

Non Patent Literature

[Non Patent Literature 1]
CPRI, "CPRI Specification V5.0," September, 2011, http://www.cpri.info/spec.html
[Non Patent Literature 2]
3GPP TS 36.104 V10.4.0, "Evolved Universal Terrestrial Radio Access (E-UTRA) semikoron Base Station (BS) radio transmission and reception", p. 28 (September 2011).

All radio bands are not always used in signal transmission, and there is an unused free radio band according to the number of terminals under control of the RRU 120 and a requested transmission rate. Thus, even if the system band width is 20 MHz, only the radio band corresponding to 10 MHz or 5 MHz may be used. In this case, the sampling frequency $f_s$ higher than necessary is used in converting a radio signal into a digital signal, and the band of the PON system is used wastefully.

In the uplink, as shown in FIG. 2-19, the RRU converts a radio signal into IQ data in accordance with always constant sampling frequency and quantization bit number without depending on the situation of allocation of RB to terminals. Thus, a fixed amount of information is always transmitted from the RRU to the BBU, and even in a situation where there is no radio terminal belonging to the RRU, a signal is transmitted from the RRU to the BBU, and a band between the BBU and the RRU is occupied.

This also applies to the downlink, and since a radio signal is converted into IQ data in accordance with always constant sampling frequency and quantization bit number, a signal is transmitted from the BBU to the RRU to which no radio terminal belongs, so that the band between the BBU and the RRU is occupied.

Thus, in order to solve the above problem, an object of the present disclosure is to provide a distributed radio communication base station system, which can effectively utilize a band between BBU and RRU, a base band unit, a remote radio unit, and a method for operating a distributed radio communication base station system.

SUMMARY

In the present disclosure, data to be RoF transmitted through an optical fiber is compressed. For example, in the disclosure, a sampling frequency is changed according to an allocation situation of a radio band, and digital RoF transmission is performed using the sampling frequency. Further, in the disclosure, in order to solve the above problem, transmission/stop of a radio signal between BBU and RRU is controlled according to the allocation situation of the radio band to radio terminals, and thereby contributing to effective utilization of a band between the BBU and the RRU.

Specifically, a distributed radio communication base station system of the present disclosure is a distributed radio communication base station system in which a function of a base station transmitting and receiving a radio signal to and from a radio terminal is divided into a base band unit (BBU) and a remote radio unit (RRU), and the distributed radio communication base station system is provided with an optical fiber connecting the BBU and the RRU and performing RoF (Radio over Fiber) transmission between the BBU and the RRU with an optical signal and a compression function of compressing data to be RoF transmitted through the optical fiber.

The base band unit and the remote radio unit according to the present disclosure are respectively BBU and RRU of the distributed radio communication base station system.

The compression function may include a sampling frequency change function of changing a sampling frequency of an optical signal to be RoF transmitted through the optical fiber from a predetermined value according to an allocation situation of the radio signal and a sampling frequency restoration function of restoring the sampling frequency to the predetermined value when the optical signal is received through the optical fiber and removing a aliasing noise generated in the restoration of the sampling frequency.

In the present disclosure, since the sampling frequency is reduced according to the allocation situation of the radio band, a band required between BBU and RRU can be reduced.

The sampling frequency change function of the distributed radio communication base station system according to the present disclosure can reduces the sampling frequency according to the allocated band of the radio signal.

The sampling frequency change function of the distributed radio communication base station system according to the present disclosure can reduces the sampling frequency in a range where signal quality deterioration given to the radio signal by the aliasing noise is not more than an allowable value.

The optical fiber is a PON (Passive Optical Network) system connecting the single BBU and the plurality of RRUs.

In the distributed radio communication base station system, the installation/operation cost of an optical fiber transmission path is reduced by connecting the single BBU and the plurality of RRUs by the PON system, and the band utilization efficiency can be enhanced by obtaining a statistical multiplexing gain owing to sharing of the optical fiber transmission path.

The compression function is characterized by including a transmission approval/disapproval function of detecting a no signal section of a transmission signal to be RoF transmitted through the optical fiber and stopping the RoF transmission in the no signal section.

In the present disclosure, the BBU and the RRU switch a state of a radio signal between a transmission state and a non-transmission state according to an allocation situation of a radio band to a radio terminal. A no signal section corresponding to no signal data is detected, and transmission in the no signal section is stopped; therefore, a band transmitted between the BBU and the RRU can be reduced. Accordingly, the present disclosure can provide a distributed radio communication base station system, which can effectively utilize a band between BBU and RRU, a base band unit, a remote radio unit, and a method for operating a distributed radio communication base station system.

The transmission approval/disapproval function of the distributed radio communication base station system according to the present disclosure is characterized by restoring the no signal section of the transmission signal when the transmission signal is started to be received through the optical fiber.

The transmission approval/disapproval function of the distributed radio communication base station system according to the present disclosure is characterized by detecting the no signal section of the transmission signal on the transmission side.

The transmission approval/disapproval function of the distributed radio communication base station system according to the present disclosure is characterized in that the base station detects the no signal section of the transmission signal from the RRU to the BBU based on radio band information set in communication with the radio terminal, and the BBU instructs the RRU to stop the RoF transmission in the no signal section.

The distributed radio communication base station system according to the present disclosure is characterized in that the optical fiber is a PON system connecting the single BBU and the plurality of RRUs, and the distributed radio communication base station system further has an OLT (Optical Line Terminal) function which is provided on the BBU side of the PON system, mutually converts a signal format treated in the BBU and a signal format transmittable in the PON system, and controls a transmission timing avoiding collision of optical signals in the PON system and an ONU (Optical Network Unit) function which is provided on the RRU side of the PON system, mutually converts a signal format treated in the RRU and a signal format transmittable in the PON system, and transmits an uplink optical signal at a timing designated by the OLT function.

In the distributed radio communication base station system, the installation/operation cost of the optical fiber transmission path is reduced by connecting the single BBU and the plurality of RRUs by the PON system, and the band utilization efficiency can be enhanced by obtaining the statistical multiplexing gain owing to sharing of the optical fiber transmission path.

Specifically, a method for operating a distributed radio communication base station system according to the present disclosure is a method for operating a distributed radio communication base station system in which a function of a base station transmitting and receiving a radio signal to and from a radio terminal is divided into BBU and RRU, and the method includes a compression procedure for compressing data to be RoF transmitted through the optical fiber in the RoF transmission between the BBU and the RRU with an optical signal.

In the method for operating a distributed radio communication base station system according to the present disclosure, in the compression procedure, there may be performed a sampling frequency change procedure for reducing a sampling frequency of an optical signal to be RoF transmitted through the optical fiber according to an allocation situation of the radio signal and a sampling frequency restoration procedure for restoring the sampling frequency to the predetermined value when the optical signal is received through the optical fiber and removing a aliasing noise generated in the restoration of the sampling frequency.

In the method for operating a distributed radio communication base station system according to the present disclosure, in the compression procedure, a no signal section of a transmitted signal to be RoF transmitted through the optical fiber is detected, and the RoF transmission in the no signal section may be stopped.

The above respective disclosures can be combined as much as possible.

The present disclosure can provide a distributed radio communication base station system, which can effectively utilize a band between BBU and RRU, a base band unit, a remote radio unit, and a method for operating a distributed radio communication base station system.

BRIEF DESCRIPTION OF THE DRAWINGS

FIG. 1-2 is a view for explaining a remote radio unit according to the disclosure;

FIG. 1-3 is a view for explaining a base band unit according to the disclosure;

FIG. 1-4 is a view for explaining the distributed radio communication base station system according to the disclosure;

FIG. 1-5 is a view for explaining an adapter of the base band unit according to the disclosure;

FIG. 1-6 is a view for explaining an adapter of the remote radio unit according to the disclosure;

FIG. 1-7 is a view for explaining the remote radio unit according to the disclosure;

FIG. 1-8 is a view for explaining the base band unit according to the disclosure;

FIG. 2-1 is a view for explaining a remote radio unit according to Embodiment 2-1;

FIG. 2-2 is a view for explaining a base band unit according to Embodiment 2-1;

FIG. 2-3 is a view for explaining a method for operating the remote radio unit according to Embodiment 2-1;

FIG. 2-4 is a view showing an example of a determination table of a sampling frequency;

FIG. 2-5 is a view for explaining an operation method in a downlink of the distributed radio communication base station system according to the disclosure;

FIG. 2-6 is a view for explaining an operation method in an uplink of the distributed radio communication base station system according to the disclosure;

FIG. 2-7 is a view for explaining the remote radio unit according to Embodiment 2-2;

FIG. 2-8 is a view for explaining a filter bank (downlink) of the remote radio unit according to Embodiment 2-1;

FIG. 2-9 is a view for explaining a filter bank (uplink) of the remote radio unit according to Embodiment 2-1;

FIG. 2-10 is a view for explaining the base band unit according to Embodiment 2-2;

FIG. 2-11 is a view for explaining a method for operating the remote radio unit according to Embodiment 2-2;

FIG. 2-12 shows an example of candidates of the sampling frequency;

FIG. 2-13 is a view for explaining a filter bank (downlink) of the remote radio unit according to Embodiment 2-2;

FIG. 2-14 is a view for explaining a filter bank (uplink) of the remote radio unit according to Embodiment 2-2;

FIG. 2-15 is a view for explaining a distributed radio communication base station system related to the disclosure;

FIG. 2-16 is a view for explaining a remote radio unit related to the disclosure;

FIG. 2-17 is a view for explaining a base band unit related to the disclosure;

FIG. 2-18 is a view for explaining a radio band allocation method in an LTE system;

FIG. 2-19 is a view for explaining operation of the distributed radio communication base station system related to the disclosure;

FIG. 3-1 is a view for explaining a remote radio unit according to the disclosure;

FIG. 3-2 is a view for explaining a base band unit according to the disclosure;

FIG. 3-3 is a view for explaining operation of the distributed radio communication base station system according to the disclosure;

FIG. 3-4 is a view for explaining the remote radio unit according to the disclosure;

FIG. 3-5 is a view for explaining the remote radio unit according to the disclosure; and FIG. 3-6 is a view for explaining the base band unit according to the disclosure.

DETAILED DESCRIPTION OF THE PREFERRED EMBODIMENT

Figure 1:
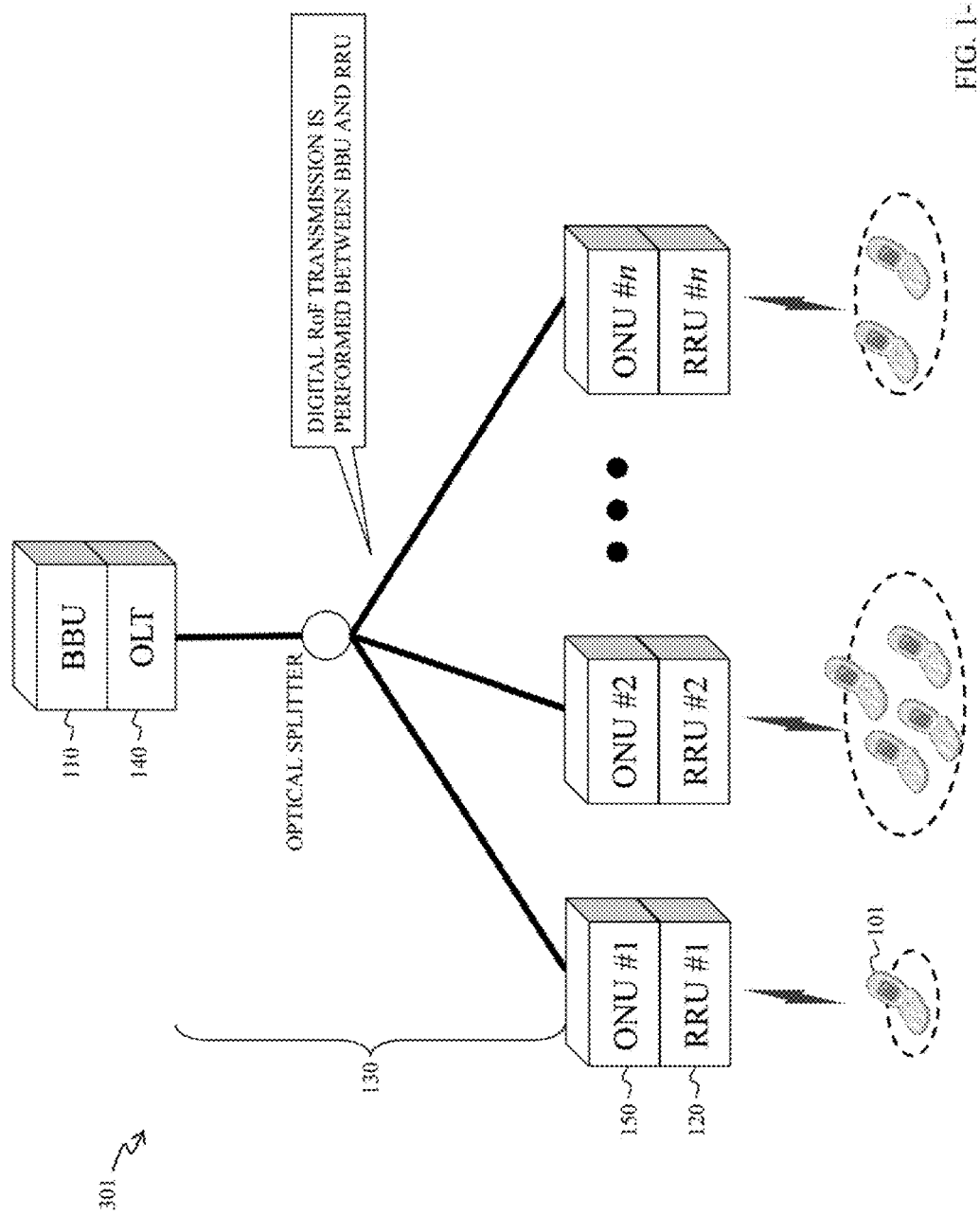
FIG. 1-1 is a view for explaining a distributed radio communication base station system according to the present disclosure.

Embodiments of the present disclosure will be described with reference to the accompanying drawings. The embodiments to be described hereinafter are examples of the present disclosure, and the present disclosure is not limited to the following embodiments. Components denoted by the same reference numerals in the present specification and the drawings mutually denote the same components.
(Embodiment 1)

In the disclosure according to this embodiment, the installation/operation cost of the optical fiber transmission path is reduced by connecting a single BBU and a plurality of RRUs by the PON system, and the band utilization efficiency is enhanced by obtaining a statistical multiplexing gain owing to sharing of an optical fiber transmission path.

Specifically, a distributed radio communication base station system according to the present disclosure is a distributed radio communication base station system in which a function of a base station transmitting and receiving a radio signal to and from a radio terminal is divided into a single base band unit (BBU) and a plurality of remote radio units (RRUs), and is characterized by being provided with a PON (Passive Optical Network) system connecting the single BBU and the plurality of RRUs and performing RoF (Radio over Fiber) transmission between the BBU and the RRU with an optical signal, an OLT (Optical Line Terminal) function which is provided on the BBU side of the PON system, mutually converts a signal format treated in the BBU and a signal format transmittable in the PON system, and controls a transmission timing avoiding collision of optical signals in the PON system, and an ONU (Optical Network Unit) function which is provided on the RRU side of the PON system, mutually converts a signal format treated in the RRU and a signal format transmittable in the PON system, and transmits an uplink optical signal at a timing designated by the OLT function.

A method for operating a distributed radio communication base station system according to the present disclosure is a method for operating a distributed radio communication base station system in which a function of a base station transmitting and receiving a radio signal to and from a radio terminal is divided into a single BBU and a plurality of RRUs, and is characterized in that the single BBU and the plurality of RRUs are connected by a PON system, the BBU and the RRU are RoF transmitted with an optical signal, an OLT function provided on the BBU side of the PON system mutually converts a signal format treated in the BBU and a signal format transmittable in the PON system, and controls a transmission timing avoiding collision of optical signals in the PON system, and the ONU function provided on the RRU side of the PON system mutually converts the signal format treated in the RRU and the signal format transmittable in the PON system and transmits an uplink optical signal at a timing designated by the OLT function.

The base band unit and the remote radio unit according to the present disclosure are respectively BBU and RRU of the distributed radio communication base station system.

In the present disclosure, in order for the single BBU to store the plurality of RRUs, the BBU and the RRU are connected through the PON system. A PON signal multiplexing method may be selected from TDM (Time Division Multiplex), WDM (Wavelength Division Multiplex), FDM (Frequency Division Multiplex), and so on. According to a PON configuration, a single optical fiber transmission path is shared among the plurality of RRUs, whereby the installation/operation cost can be reduced, and, in addition, a cooperative operation among the plurality of RRUs can be achieved. When data is not required to be transmitted over a certain link between the BBU and the RRU, the band of the BBU-RRU link is dynamically allocated to another RRU for use, whereby the band utilization efficiency in an optical access section owing to the statistical multiplexing gain can be enhanced.

Accordingly, the present disclosure can provide a distributed radio communication base station system, which can reduce the installation/operation cost and enhance the band utilization efficiency in the optical access section, a base band unit, a remote radio unit, and a method for operating a distributed radio communication base station system.

In the distributed radio communication base station system according to the present disclosure, the BBU may include the OLT function, and the RRU may include the ONU function.

The OLT function of the distributed radio communication base station system according to the present disclosure is realized by a first adapter, which mutually converts the signal format treated in the BBU and the signal format transmittable in the PON system, and OLT which controls the transmission timing avoiding collision of optical signals in the PON system, the first adapter and the OLT are connected in this order from the BBU side between the BBU and the PON system, the ONU function is realized by a second adapter, which mutually converts the signal format treated in the RRU and the signal format transmittable in the PON system, and ONU which transmits an uplink optical signal at a timing designated by the OLT function, the second adapter and the ONU may be connected in this order from the RRU side between the RRU and the PON system.

By virtue of the use of the first adapter and the second adapter, the distributed radio communication base station system according to the present disclosure can be configured by utilizing the existing BBU, RRU, OLT, and ONU.

The ONU function of the distributed radio communication base station system according to the present disclosure transmits a radio signal quantity from a portable terminal to the OLT function, the OLT function calculates a transmission time and a transmission time period of an uplink optical signal for each of the RRUs from the collected radio signal quantity, notifies the ONU function of the calculated information, and makes the ONU function transmit the uplink optical signal at the transmission time and during the transmission time period. This constitution can enhance the band utilization efficiency in the optical access section.

The BBU and the RRU of the distributed radio communication base station system according to the present disclosure are characterized by having a compression function of compressing data transmitted mutually between the BBU and the RRU and transmitting the compressed data in the PON system. By virtue of the data compression, the band utilization efficiency in the optical access section can be further enhanced.

(Embodiment 1-1)

FIG. 1-1 is a view for explaining a distributed radio communication base station system 301 of this embodiment.

The distributed radio communication base station system 301 is a distributed radio communication base station system in which a function of a base station transmitting and receiving a radio signal to and from a radio terminal 101 is divided into a single BBU 110 and a plurality of RRUs 120 and is characterized by being provided with a PON system 130 connecting the single BBU 110 and the plurality of RRUs 120 and performing RoF transmission between the BBU and the RRU with an optical signal, an OLT function 140 which is provided on the BBU 110 side of the PON system 130, mutually converts a signal format treated in the BBU 110 and a signal format transmittable in the PON system 130, and controls a transmission timing avoiding collision of optical signals in the PON system 130, and an ONU function 150 which is provided on the RRU 120 side of the PON system 130, mutually converts a signal format treated in the RRU 120 and the signal format transmittable in the PON system 130, and transmits an uplink optical signal at a timing designated by the OLT function 140.

In the distributed radio communication base station system 301, the BBU 110 includes the OLT function 140, and the RRU 120 includes the ONU function 150.

In FIG. 1-1, unlike the prior art, the OLT function 140 is added to the BBU 110, the ONU function 150 is added to the RRU 120, and the BBU and the RRU are connected by the PON system 130. For example, when considering the case where a TDM-PON system such as GE-PON (IEEE 802.3 ah) and 10G-EPON (IEEE 802.3 av) is applied as the PON system 130, the OLT function 140 includes a function of mapping IQ data, output from the BBU 110 in a downlink, to an Ethernet (registered trademark) frame and transmitting the data at a predetermined timing and a function of extracting the IQ data from the Ethernet (registered trademark) frame received in an uplink. Meanwhile, the ONU function 150 includes a function of extracting the IQ data from the Ethernet (registered trademark) frame received in the downlink and a function of mapping the IQ data, output from the RRU 120 in the uplink, to the Ethernet (registered trademark) frame and transmitting the IQ data at a predetermined timing.

Figures 1, 2:
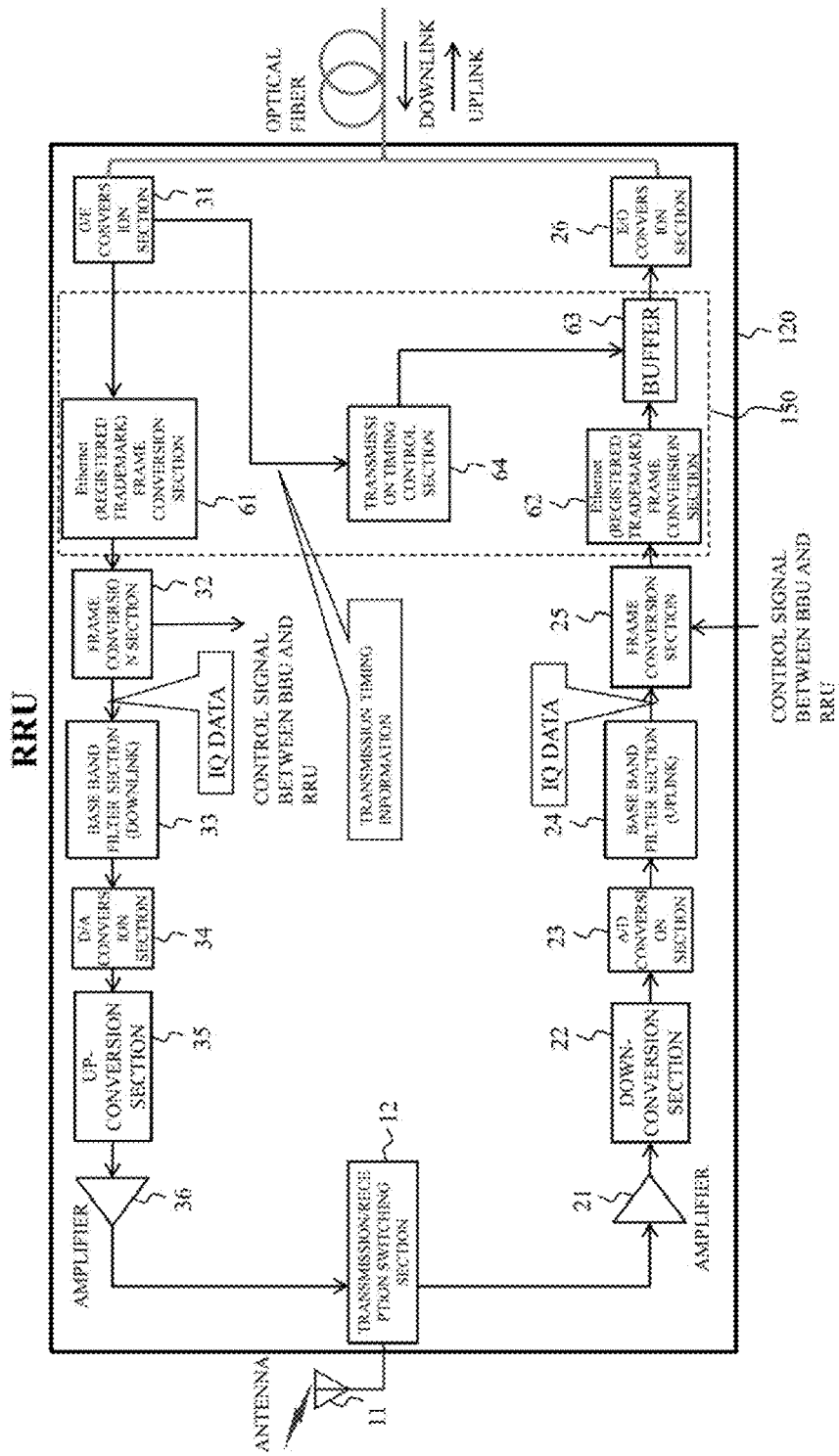

FIG. 1-2 is a device configuration example of the RRU 120 of the distributed radio communication base station system 301. Unlike the prior art, for downlink signal processing, the RRU 120 has an Ethernet (registered trademark) frame conversion section 61 which takes out IQ data from the received Ethernet (registered trademark) frame. Meanwhile, for uplink signal processing, the RRU 120 has an Ethernet (registered trademark) frame conversion section 62 which converts the IQ data into an Ethernet (registered trademark) frame signal, a buffer 63 which stores a signal to be transmitted, and a transmission timing control section 64 which controls an uplink transmission timing. Uplink transmission timing information is notified from the BBU 110. The Ethernet (registered trademark) frame conversion section 61, the Ethernet (registered trademark) frame conversion section 62, the buffer 63, and the transmission timing control section 64 are included in the ONU function 150.

Figures 1, 2, 3:
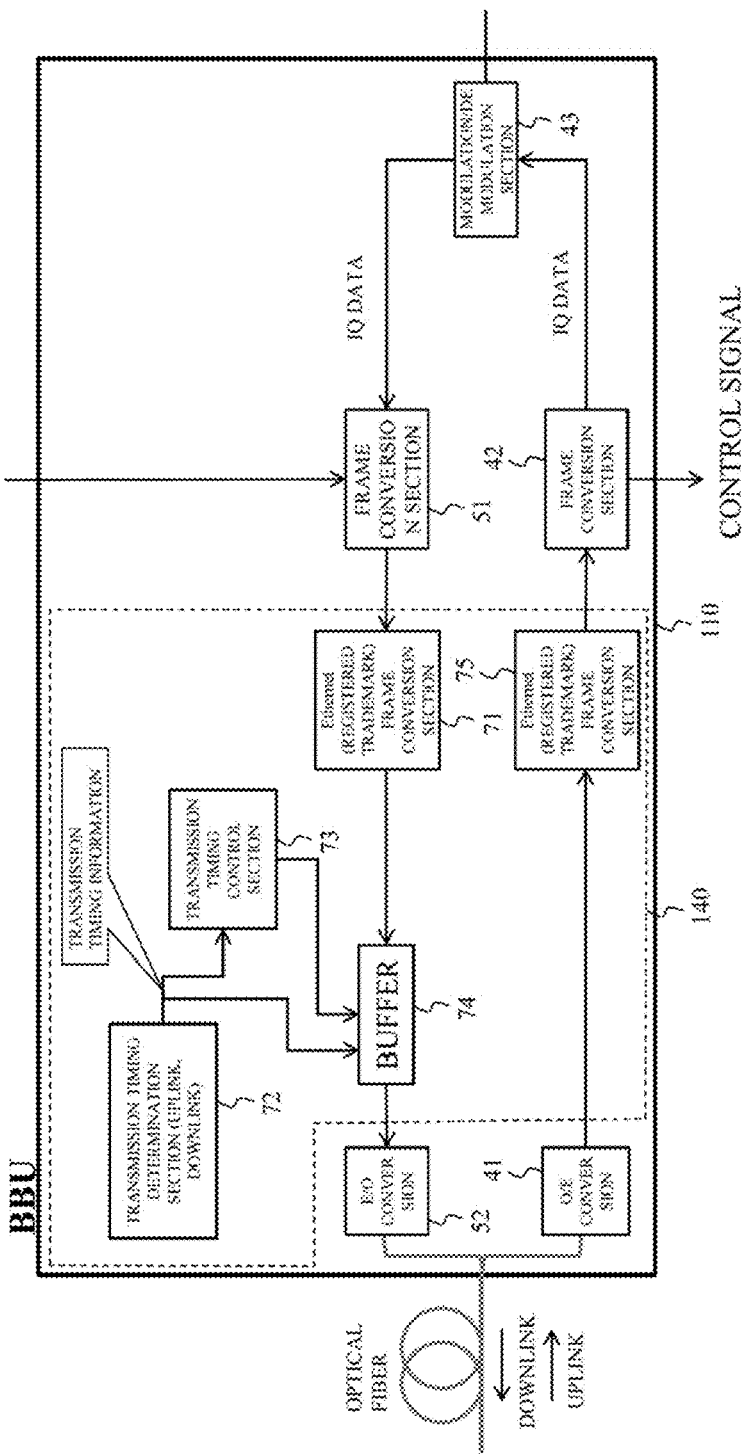

FIG. 1-3 is a device configuration example of the BBU 110 of the distributed radio communication base station system 301. Unlike the prior art, for the downlink signal processing, the BBU 110 has an Ethernet (registered trademark) frame conversion section 71 which converts IQ data into an Ethernet (registered trademark) frame, a transmission timing determination section 72 which determines each signal transmission timing of the BBU 110 and the RRU 120, a transmission timing control section 73 for transmitting a signal at a predetermined timing, and a buffer 74 which stores a signal to be transmitted. Meanwhile, for the uplink signal processing, the BBU 110 has an Ethernet (registered trademark) frame conversion section 75 which takes out the IQ data from a received Ethernet (registered trademark) frame. The Ethernet (registered trademark) frame conversion section 71, the transmission timing determination section 72, the transmission timing control section 73, the buffer 74, and the Ethernet (registered trademark) frame conversion section 75 are included in the OLT function 140.

Not only the IQ data but also control information such as allocation information of radio bands (including both uplink and downlink) scheduled in the BBU 110 and transmission approval/disapproval information of the RRU 120 may be transmitted between the BBU and the RRU. The control information is used in, for example, processings of Embodiments 1 to 4 to be described later.

(Embodiment 1-2)

Embodiment 1-2 is different from Embodiment 1-1, and the present disclosure can be practiced using the existing BBU, RRU, OLT, and ONU. FIG. 1-4 is a view for explaining a distributed radio communication base station system 302 of this embodiment. An OLT function 140 of the distributed radio communication base station system 302 is realized by a first adapter 210 mutually converting a signal format treated in BBU 110 and a signal format transmittable in a PON system 130 and OLT 220 controlling a transmission timing avoiding collision of optical signals in the PON system 130, the first adapter 210 and the OLT 220 are connected in this order from the BBU 110 side between the BBU 110 and the PON system 130, the ONU function 150 is realized by a second adapter 230 mutually converting a signal format treated in RRU 120 and a signal format transmittable in the PON system 130 and ONU 240 transmitting an uplink optical signal at a timing designated by the OLT function 140, and the second adapter 230 and the ONU 240 are connected in this order from the RRU 120 side between the RRU 120 and the PON system 130.

The distributed radio communication base station system 302 is different from the distributed radio communication base station system 301 of FIG. 1-1, the adapters (210, 230) are added to, respectively, between the BBU 110 and the OLT 220 and between the RRU 120 and the ONU 240, and the BBU and the RRU are connected by the PON system 130.

The function of the first adapter 210 between the BBU and the OLT includes a function of converting a downlink optical signal output from the BBU 110 into a signal having a format capable of being recognized by an input interface of the OLT 220 and a function of converting an uplink signal output from the OLT 220 into an optical signal having a format capable of being recognized by an input interface of the BBU 110.

Meanwhile, the function of the second adapter 230 between the ONU and the RRU includes a function of converting a downlink signal output from the ONU 240 into an optical signal having a format capable of being recognized by an input interface of the RRU 120 and a function of converting an uplink optical signal output from the RRU 120 into a signal having a format capable of being recognized by an input interface of the ONU 240.

A device configuration example of the first adapter 210 is shown in FIG. 1-5. For the downlink signal processing, the first adapter 210 includes an O/E conversion section 76 and an Ethernet (registered trademark) frame conversion section 71 which converts IQ data into an Ethernet (registered trademark) frame. Meanwhile, for the uplink signal processing, the first adapter 210 includes an Ethernet (registered trademark) frame conversion section 75 which takes out the IQ data from the Ethernet (registered trademark) frame and an E/O conversion section 77. The transmission timing determination section 72, the transmission timing control section 73, and the buffer 74 of FIG. 1-3 are included in the OLT 220 of FIG. 1-4.

In a conventional BBU, in order to transmit and receive an optical signal, in the first adapter 210, an optical signal and an electrical signal are converted by the O/E conversion section 76 and the E/O conversion section 77. In a conventional OLT, in order to recognize the Ethernet (registered trademark) frame, the format treated in the BBU and the Ethernet (registered trademark) frame are converted by the Ethernet (registered trademark) frame conversion sections (71 and 75).

A device configuration example of the second adapter 230 is shown in FIG. 1-6. For the downlink signal processing, the second adapter 230 includes an Ethernet (registered trademark) frame conversion section 61 which takes out IQ data from a received Ethernet (registered trademark) frame and an O/E conversion section 65. Meanwhile, for the uplink signal processing, the second adapter 230 includes an O/E conversion section 66 and an Ethernet (registered trademark) frame conversion section 62 which converts the IQ data into the Ethernet (registered trademark) frame. The buffer 63 and the transmission timing control section 64 of FIG. 1-2 are included in the ONU 150 of FIG. 1-4.

In a conventional RRU, in order to transmit and receive an optical signal, in the second adapter 230, an optical signal and an electrical signal are converted by the O/E conversion section 66 and the O/E conversion section 65. In a conventional ONU, in order to recognize the Ethernet (registered trademark) frame, the format treated in the RRU and the Ethernet (registered trademark) frame are converted by the Ethernet (registered trademark) frame conversion sections (61 and 62).

(Embodiment 1-3)

In a distributed radio communication base station system of Embodiment 1-3, a band for an uplink in a section of a PON system 130 is dynamically allocated to each RRU by dynamic bandwidth allocation (DBA). An ONU function 150 of the distributed radio communication base station system transmits a radio signal quantity from a portable terminal 101 to an OLT function 140, and the OLT function 140 calculates a transmission time and a transmission time period of an uplink optical signal for each RRU 120 from a collected radio signal quantity, notifies the ONU function 150 of the calculated information, and makes the ONU function 150 transmit the uplink optical signal at the transmission time and during the transmission time period.

DBA is a function where each ONU transmits a transmission buffer volume to OLT, the OLT calculates a data transmission time and a data transmission time period of each ONU from a collected buffer volume and notifies each ONU of the calculated information, and each ONU transmits data using a designated time zone at a designated time. Since the distributed radio communication base station system has the function of the DBA, a band width allocated between BBU and RRU with less communication traffic is reduced, and the band width allocated between the BBU and the RRU with heavy communication traffic can be increased, so that a band in an optical access section can be effectively utilized.

(Embodiment 1-4)

A distributed radio communication base station system of Embodiment 1-4 has a compression function where BBU 110 and RRU 120 compress data transmitted mutually between the BBU 110 and the RRU 120 and transmits the data through the PON system 130.

In the distributed radio communication base station system, a processing (compression processing) of reducing an information amount of a signal transmitted from the RRU 120 to the BBU 110 is performed in the uplink. A transmission band of unnecessary information can be reduced by the compression processing, and the band utilization efficiency in the uplink in the optical access section can be enhanced.

The RRU 120 or the ONU 150 may have the compression processing function, or the second adapter 230 described in FIG. 1-4 may have the compression processing function. As an example of the compression processing, it is considered that when the portable terminal 101 does not exist under control of the RRU 120, the RRU 120 stops information transmission to the BBU 110, so that unnecessary information transmission is reduced. The compression processing may be realized by transmitting control information or the like, notifying approval or disapproval of transmission, from the BBU 110 to the RRU 120. Further, allocation information of a radio band is transmitted from the BBU 110 to the RRU 120 based on scheduling information, and the RRU 120 may determine approval or disapproval of transmission based on the radio band allocation information.

In the distributed radio communication base station system, in the downlink the BBU 110 may perform the compression processing applied to the RRU 120. The BBU 110 or the OLT 220 may have the compression processing function, or the first adapter 210 described in FIG. 1-4 may have the compression processing function. According to this constitution, the band utilization efficiency in the downlink link in the optical access section can be enhanced.

A processing (expansion processing) of returning the information amount reduced by the compression processing to an original information amount may be performed. Namely, when the compression processing is performed in the BBU 110, the expansion processing is performed in the RRU 120, and when the compression processing is performed in the RRU 120, the expansion processing is performed in the BBU 110. However, when a modulation/demodulation section 43 of the BBU 110 is configured so as to be capable of recognizing a compressed signal, an expansion function is not required to be added to the BBU 110. When the BBU 110 or the RRU 120 on the transmission side performs transmission control to realize the compression processing, if the RRU 120 or the BBU 110 on the reception side is set to stop subsequent signal transmission when receiving no signal, the expansion processing is not required to be performed on the reception side.

FIG. 1-7 is a device configuration example of the RRU 120 of Embodiment 1-4. Unlike the RRU 120 of FIG. 1-2, the RRU 120 of Embodiment 1-4 has an expansion section 82 performing the expansion processing in the downlink and a compression section 81 performing the compression processing in the uplink. They are controlled based on control information such as radio band allocation information transmitted from the BBU 110.

FIG. 1-8 is a device configuration example of the BBU 110 of Embodiment 1-4. Unlike the BBU 110 of FIG. 1-3, the BBU 110 of Embodiment 1-4 has a compression section 83 performing the compression processing in the downlink and an expansion section 84 performing the expansion processing in the uplink. Although the radio band allocation information used for performing the compression processing and the expansion processing in the RRU 120 is transmitted by being added to control information between the BBU and the RRU, the radio band allocation information may be transmitted as the Ethernet (registered trademark) frame or may be transmitted by providing another control channel.

A control cycle of the compression processing may be arbitrarily set. Taking an LTE system as an example, the compressing processing may be controlled for each symbol cycle, for each 0.5 ms according to a resource block (RB), or for each 1 ms according to a scheduling cycle.

Such a compression processing may be combined with the DBA described in Embodiment 1-3.

(Effect)

In the distributed radio communication base station system described in Embodiments 1-1 to 1-4, the BBU and the plurality of RRUs are connected by the PON system, and the optical fiber transmission path is shared among the plurality of RRUs, whereby the installation/operation cost can be reduced. Further, the enhancement of the band utilization efficiency in the optical access section can be expected by the dynamic band allocation and the signal compression processing function.

(Embodiment 2)

A distributed radio communication base station system of the present disclosure is a distributed radio communication base station system in which a function of a base station transmitting and receiving a radio signal to and from a radio terminal is divided into a base band unit (BBU) and a remote radio unit (RRU), and the distributed radio communication base station system is provided with an optical fiber connecting the BBU and the RRU and performing RoF (Radio over Fiber) transmission between the BBU and the RRU with an optical signal, a sampling frequency change function of changing a sampling frequency of an optical signal to be RoF transmitted through the optical fiber from a predetermined value according to an allocation situation of the radio signal, and a sampling frequency restoration function of restoring the sampling frequency to the predetermined value when receiving the optical signal through the optical fiber and removing a aliasing noise generated in the restoration of the sampling frequency.

RRU 120 according to this embodiment is provided with a sampling frequency conversion section (uplink) 214 and a sampling frequency (downlink) restoration section 211 instead of the compression section 82 and the expansion section 81 described in Embodiment 1. The BBU 110 according to this embodiment is provided with a sampling frequency conversion section (downlink) 216 and a sampling frequency (uplink) restoration section 217 instead of the compression section 83 and the expansion section 84 described in Embodiment 1.

(Embodiment 2-1)

A device configuration example of the RRU in the application of the present disclosure is shown in FIG. 2-1. For uplink signal processing, the RRU 120 has an antenna 11 which transmits/receives a radio signal, a transmission/reception switching section 12 which switches transmission/reception, an amplifier 21 which amplifies a signal power of a received radio signal to electric power treatable in signal processing, a down-conversion section 22 which down-converts a radio signal, an A/D conversion section 23 which converts a down-converted analog signal into IQ data, a base band filter section (uplink) 24 which applies filtering processing to the IQ data, a sampling frequency information (uplink) extraction section 213 which takes out a value of a sampling frequency $f_s$ to be set from a control signal in downlink, a sampling frequency conversion section (uplink) 214 which changes the sampling frequency $f_s$, a frame conversion section 25 which multiplexes the IQ data and a control signal, and an E/O conversion section 26 which converts an electrical signal into an optical signal and transmits the optical signal.

For downlink signal processing, the RRU 120 has an O/E conversion section 31 which converts an optical signal received from the BBU 110 into an electrical signal, a frame conversion section 32 which takes out a control signal and IQ data from a received signal, a sampling frequency information (downlink) extraction section 212 which takes out a value of the sampling frequency $f_s$ to be set from a control signal in the downlink, a sampling frequency (downlink) restoration section 211 which returns the sampling frequency $f_s$, converted in the BBU 110, to an original value based on taken out information, a base band filter section (downlink) 33 which applies filtering processing to the IQ data, a D/A conversion section 34 which converts the IQ data into an analog signal, an up-conversion section 35 which up-converts an analog signal, and an amplifier 36 which amplifies electric power of a radio signal.

The RRU 120 of this embodiment is different from the RRU 120 of the related technique in that it has a sampling frequency information (uplink) extraction section 213 which takes out a value of an uplink sampling frequency $f_s$ to be set from a control signal received from the BBU 110, the sampling frequency information (downlink) extraction section 212 which takes out information on a set value of the sampling frequency $f_s$ of the IQ data received from the BBU 110 from a received control signal, the sampling frequency (downlink) restoration section 211 which returns the sampling frequency of the IQ data received from the BBU 110 to an original value, and a sampling frequency (uplink) conversion section 214 which converts the sampling frequency $f_s$ of a radio modulation signal sampled by A/D conversion into a value designated by the BBU 110.

Each shape of the base band filters 33 and 24 is changed according to the sampling frequency. The sampling frequency conversion is realized by, for example, puncturing data of an input bit sequence. Meanwhile, the sampling frequency restoration section 211 is realized by, for example, complementing 0 to the data of the input bit sequence. Further, the sampling frequency conversion can be realized by down-sampling data while filtering the data through LPF (Low Pass Filter) using a decimation filter or by averaging or adding a plurality of bits to convert the bits into 1 bit, and, thus, to perform down-sampling.

A device configuration example of the BBU in the application of the present disclosure is shown in FIG. 2-2. For the uplink signal processing, the BBU 110 has an E/O conversion section 41 which converts an optical signal transmitted through an optical fiber into an electrical signal, a frame conversion section 42 which takes out a control signal and IQ data from a received signal, a sampling frequency (uplink) restoration section 217 which returns a sampling frequency $f_s$ of the IQ data changed by the RRU 120 to an original value, and a modulation/demodulation section 43 which demodulates the IQ data.

In the BBU 110, for the downlink signal processing, the BBU 110 has the modulation/demodulation section 43 which outputs the IQ data of a modulation signal, a sampling frequency (uplink, downlink) determination section 215 which determines uplink and downlink sampling frequencies $f_s$ based on uplink and downlink radio band allocation information, a control signal generation section 50 which generates a control signal by multiplexing the determined sampling frequency $f_s$ and other control information, a sampling frequency (downlink) conversion section 216 which converts the sampling frequency $f_s$ of the IQ data into the value determined by the sampling frequency (uplink, downlink) determination section 215, a frame conversion section 51 which multiplexes the IQ data and the control signal, and an E/O conversion section 52 which converts an electrical signal into an optical signal and transmits the optical signal.

This embodiment is different from the related technique in that the BBU 110 has the sampling frequency (uplink, downlink) determination section 215 which determines uplink and downlink sampling frequencies $f_s$ based on the radio band allocation information, the control signal generation section 50 which generates a control signal by multiplexing the determined sampling frequency $f_s$ and other control information, the sampling frequency (downlink) conversion section 216 which converts the sampling frequency $f_s$ of the IQ data into the value determined by the sampling frequency (downlink) determination section 215, and the sampling frequency (uplink) restoration section 217 which returns the sampling frequency $f_s$ of the IQ data received from the RRU 120 to an original value.

Figures 1, 2, 3, 4, 5:
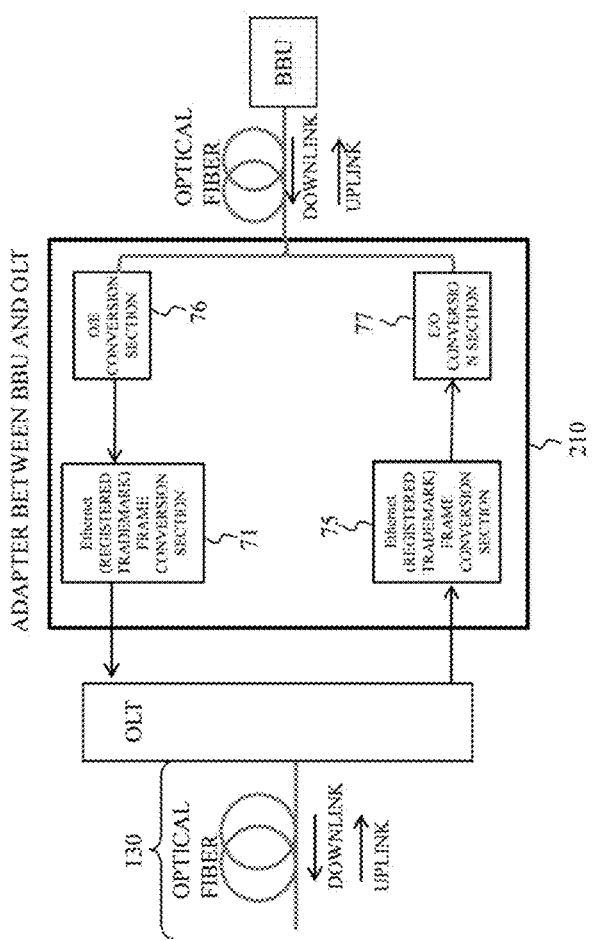
Figures 1, 2, 3, 4, 5, 6:
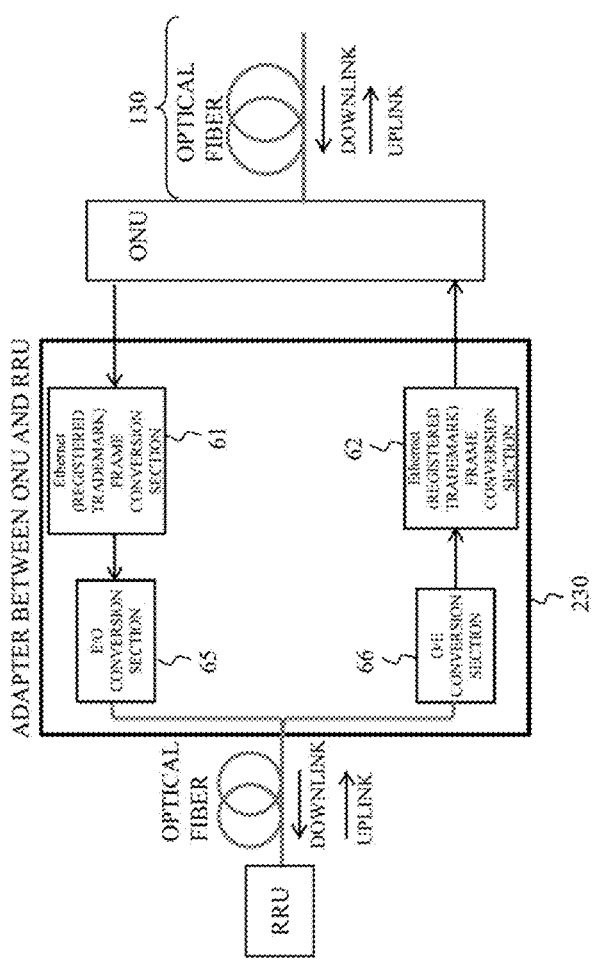
Figures 1, 2, 3, 4, 5, 6, 7:
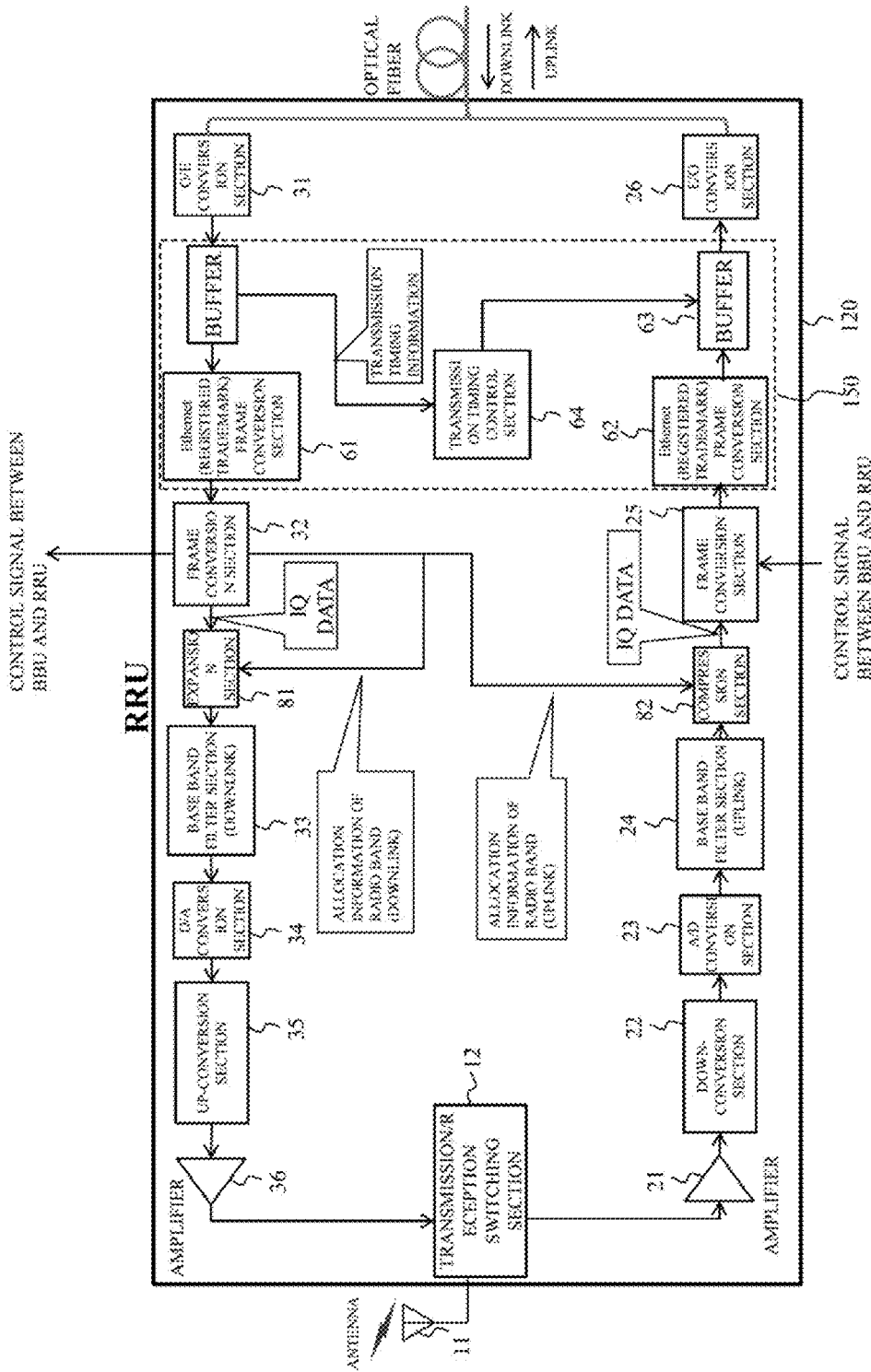
Figures 1, 2, 3, 4, 5, 6, 7, 8:
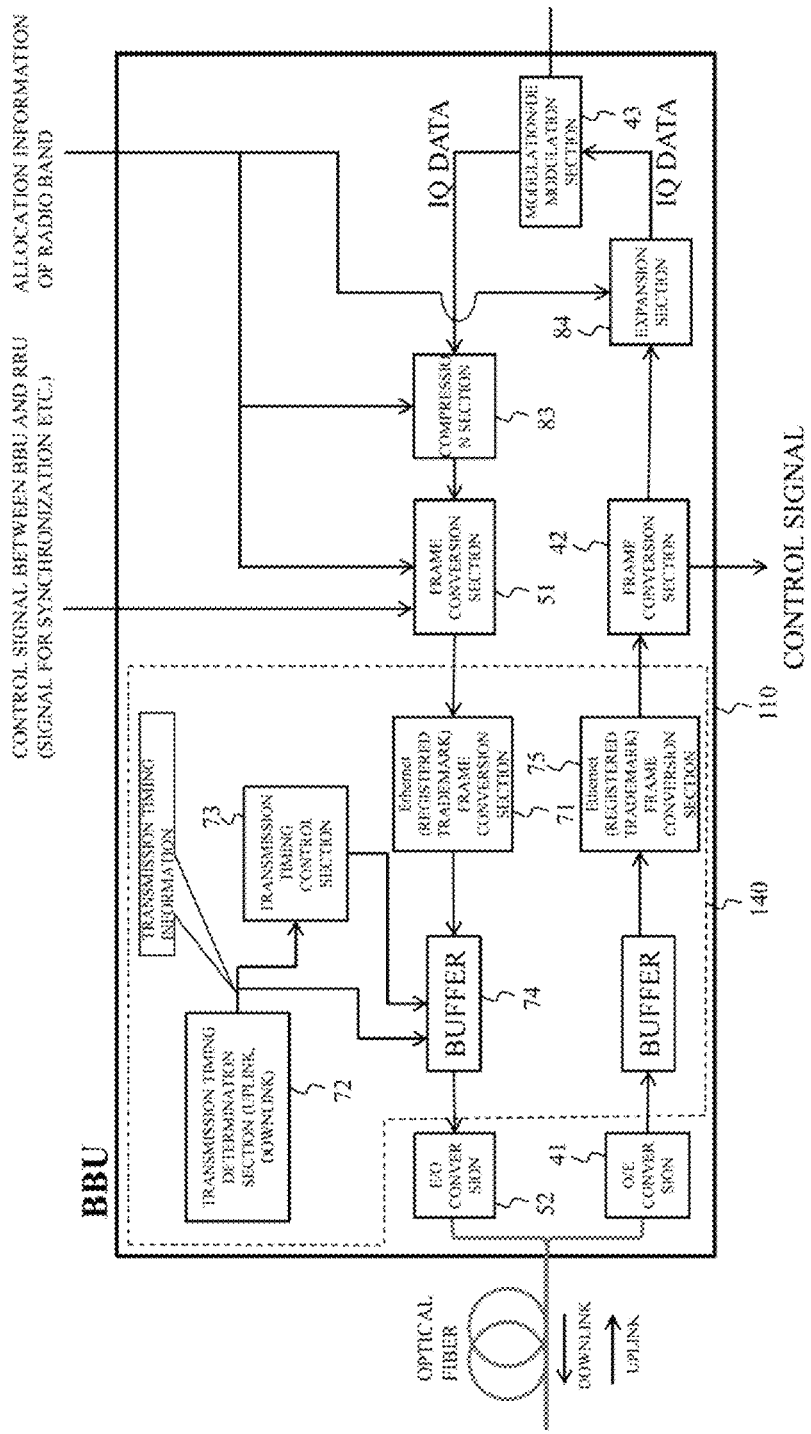
Figures 1, 2:
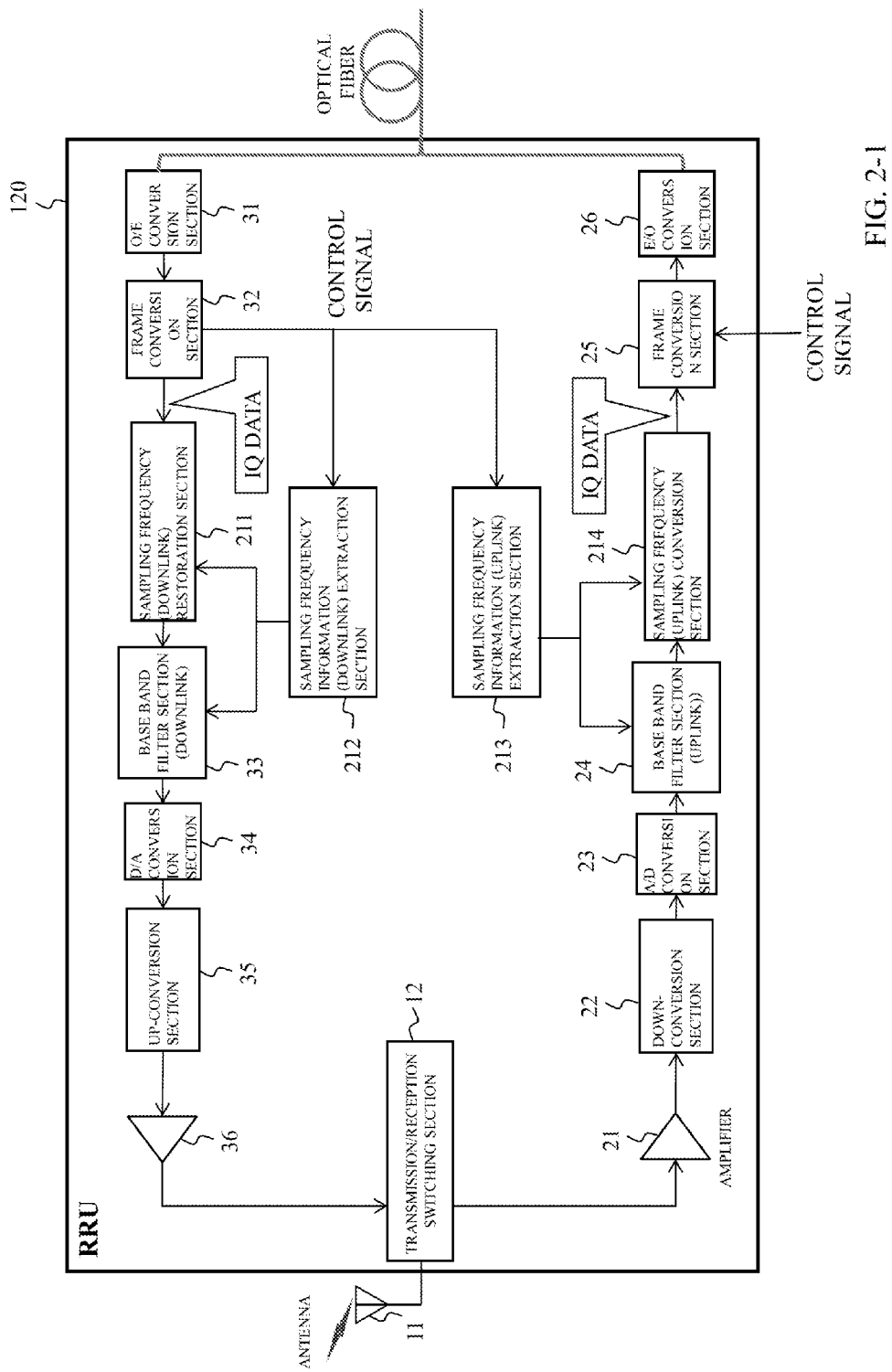
Figure 2:
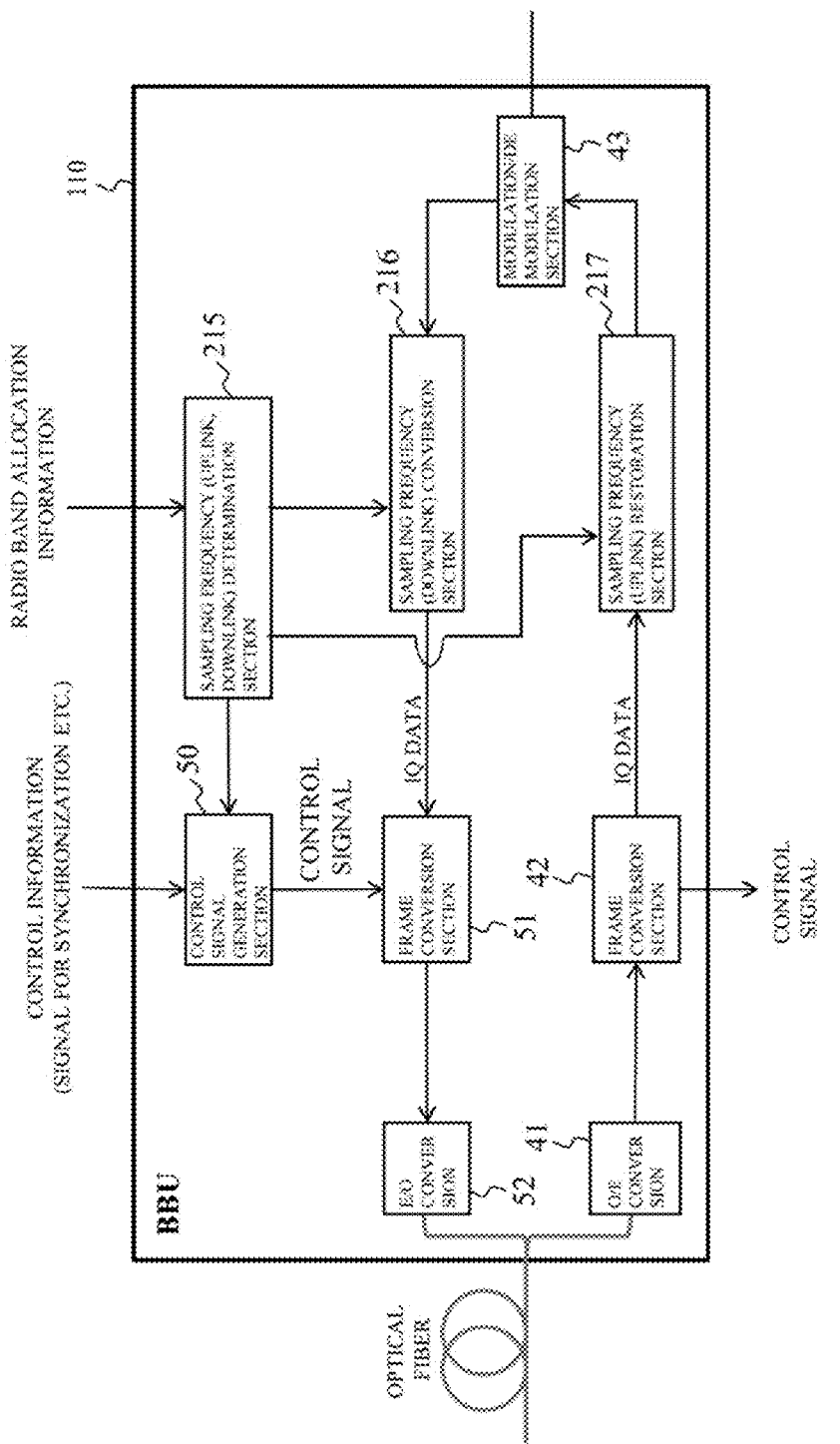
Figures 2, 3:
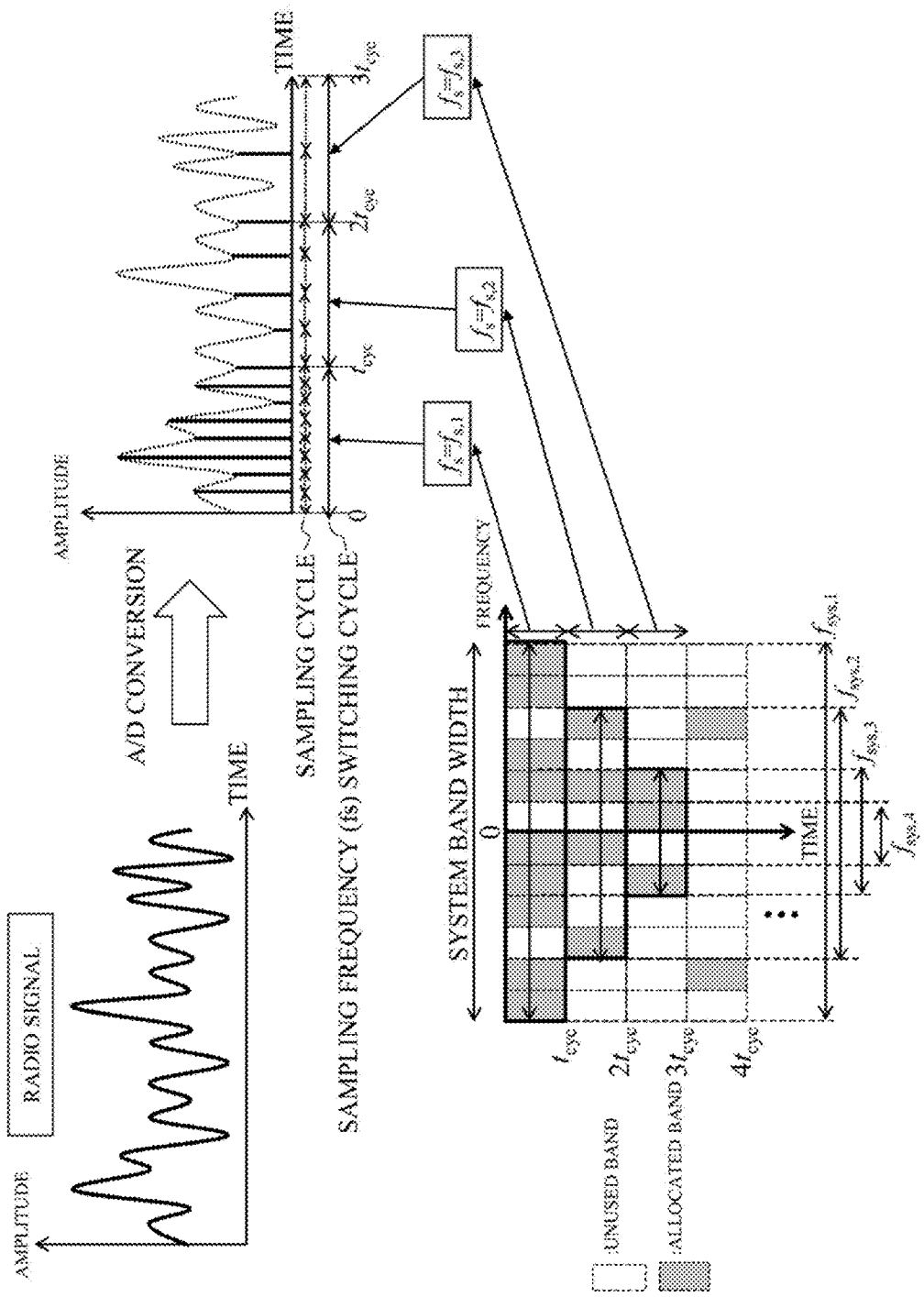
Figures 2, 3, 4, 5, 6:
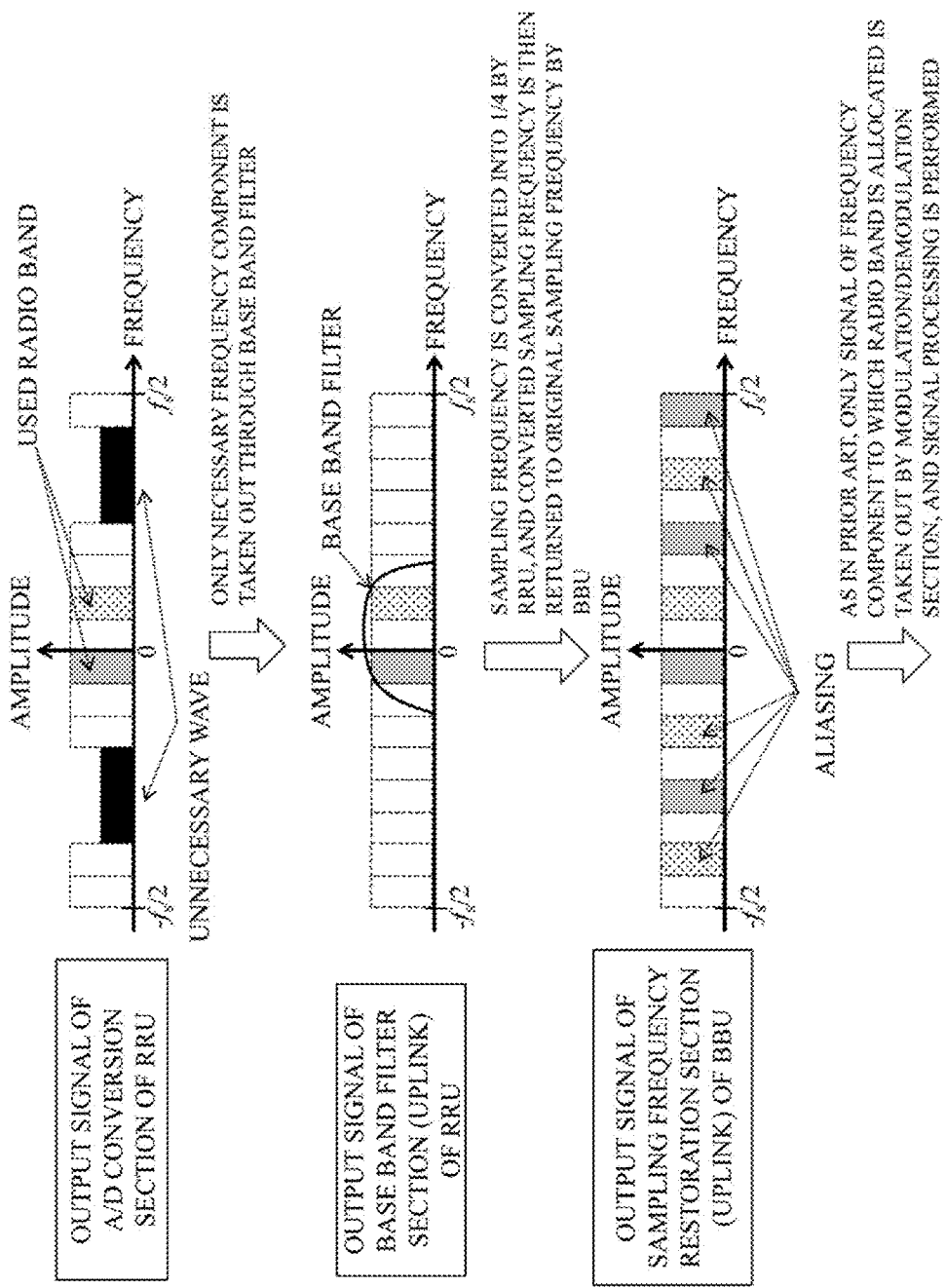
Figures 2, 3, 4, 5, 6, 7:
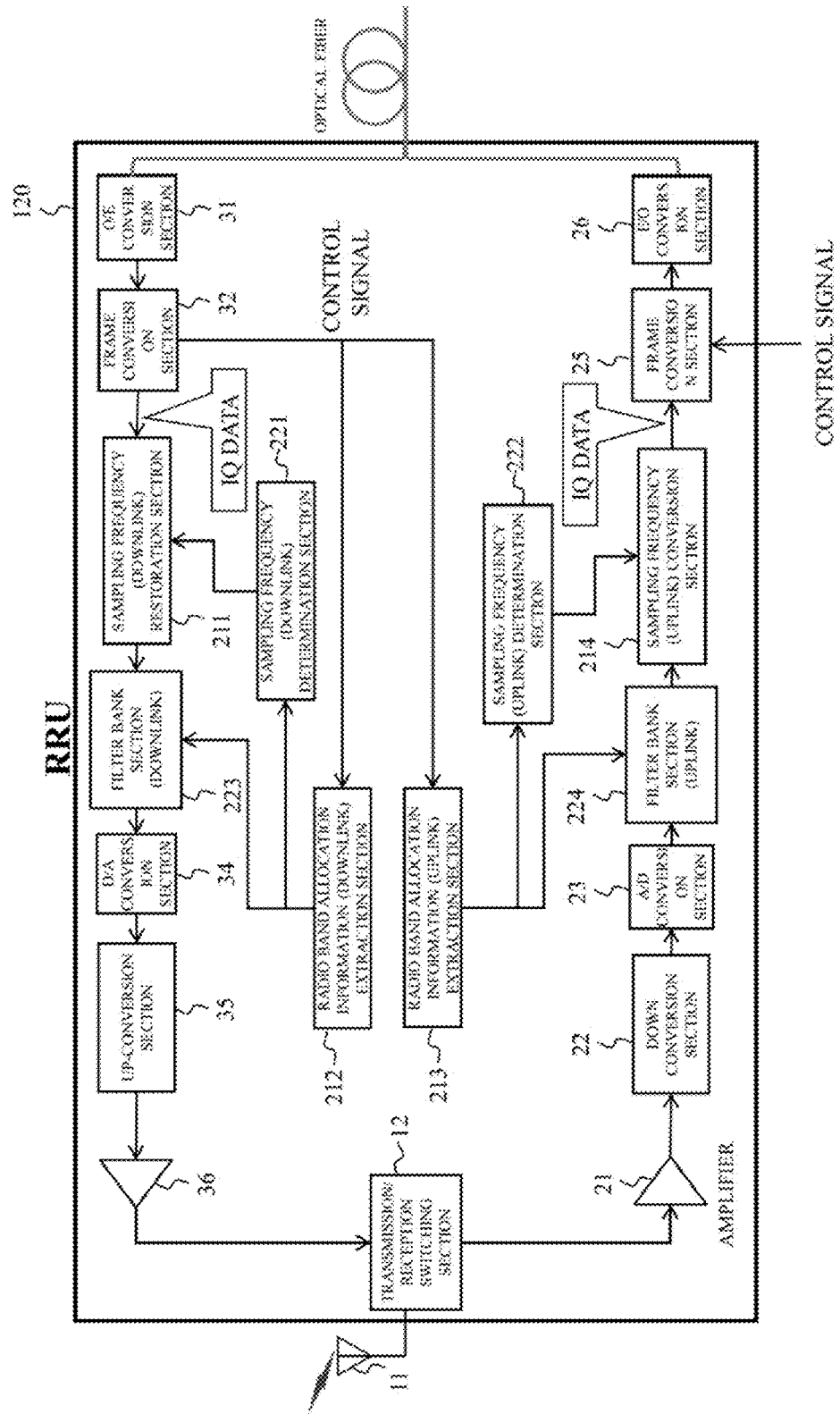
Figures 2, 3, 4, 5, 6, 7, 8:
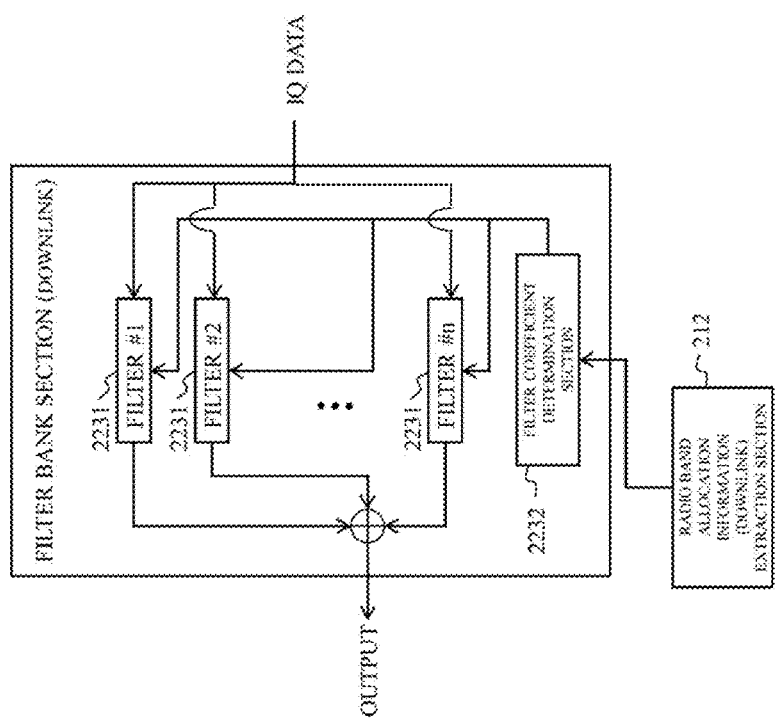
Figures 2, 3, 4, 5, 6, 7, 8, 9:
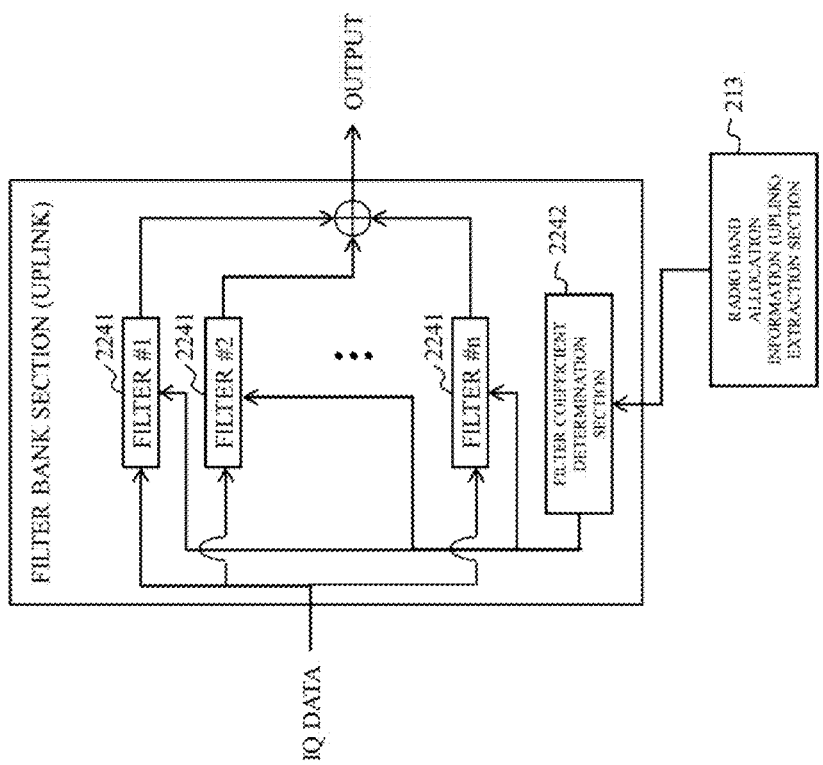
Figures 2, 3, 4, 5, 6, 7, 8, 9, 10:
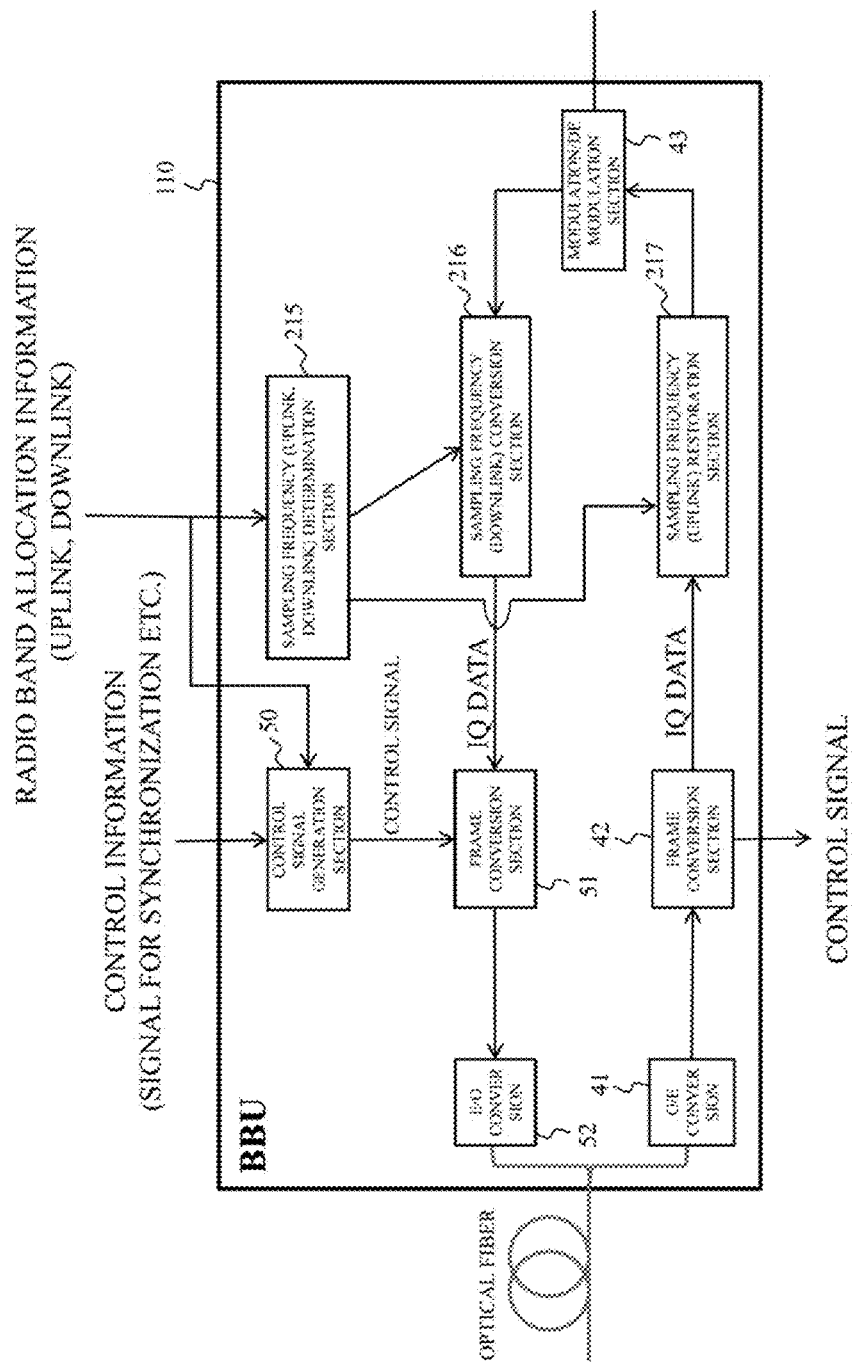
Figures 2, 3, 4, 5, 6, 7, 8, 9, 10, 11:
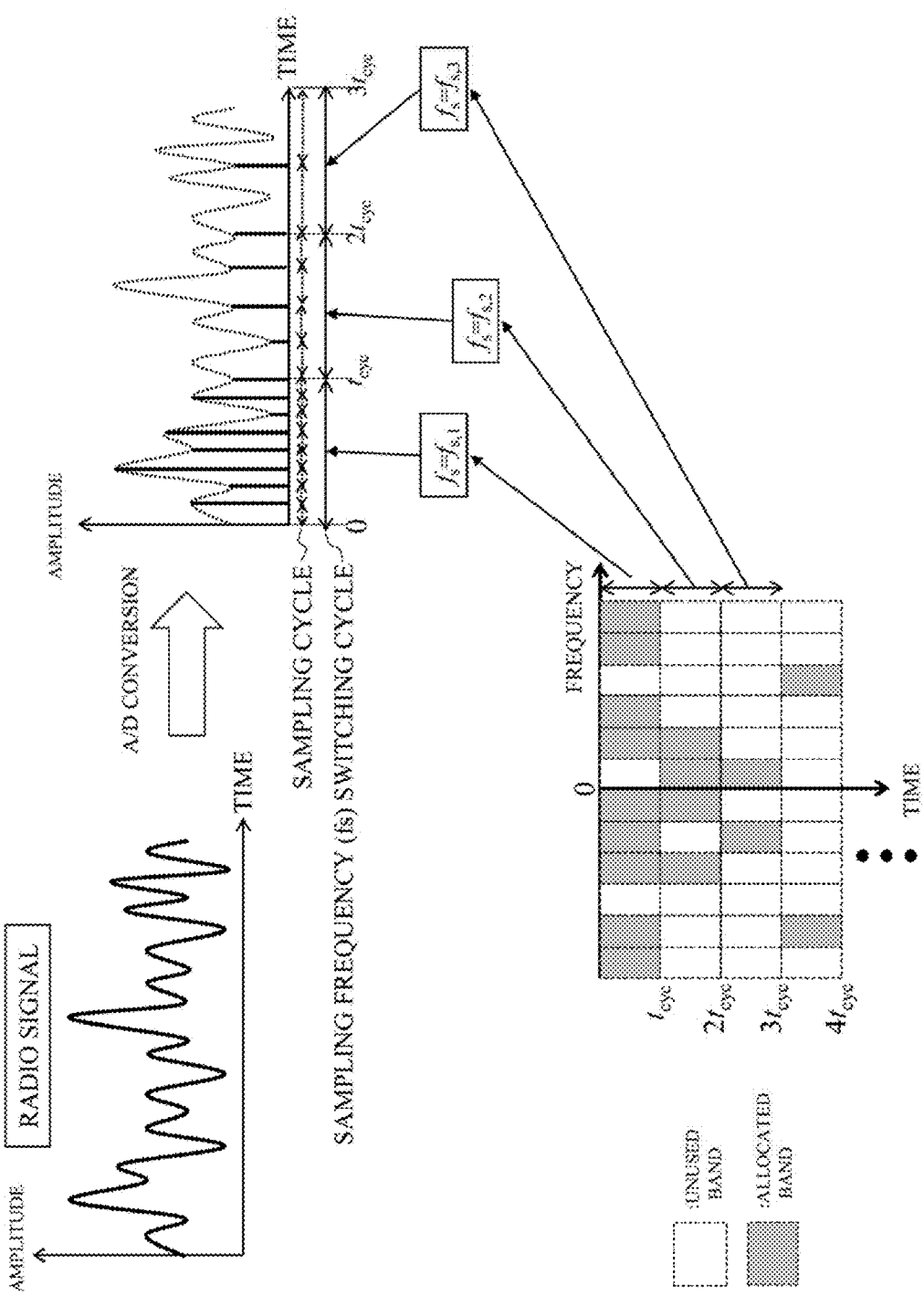
Figures 2, 3, 4, 5, 6, 7, 8, 9, 10, 11, 12, 13:
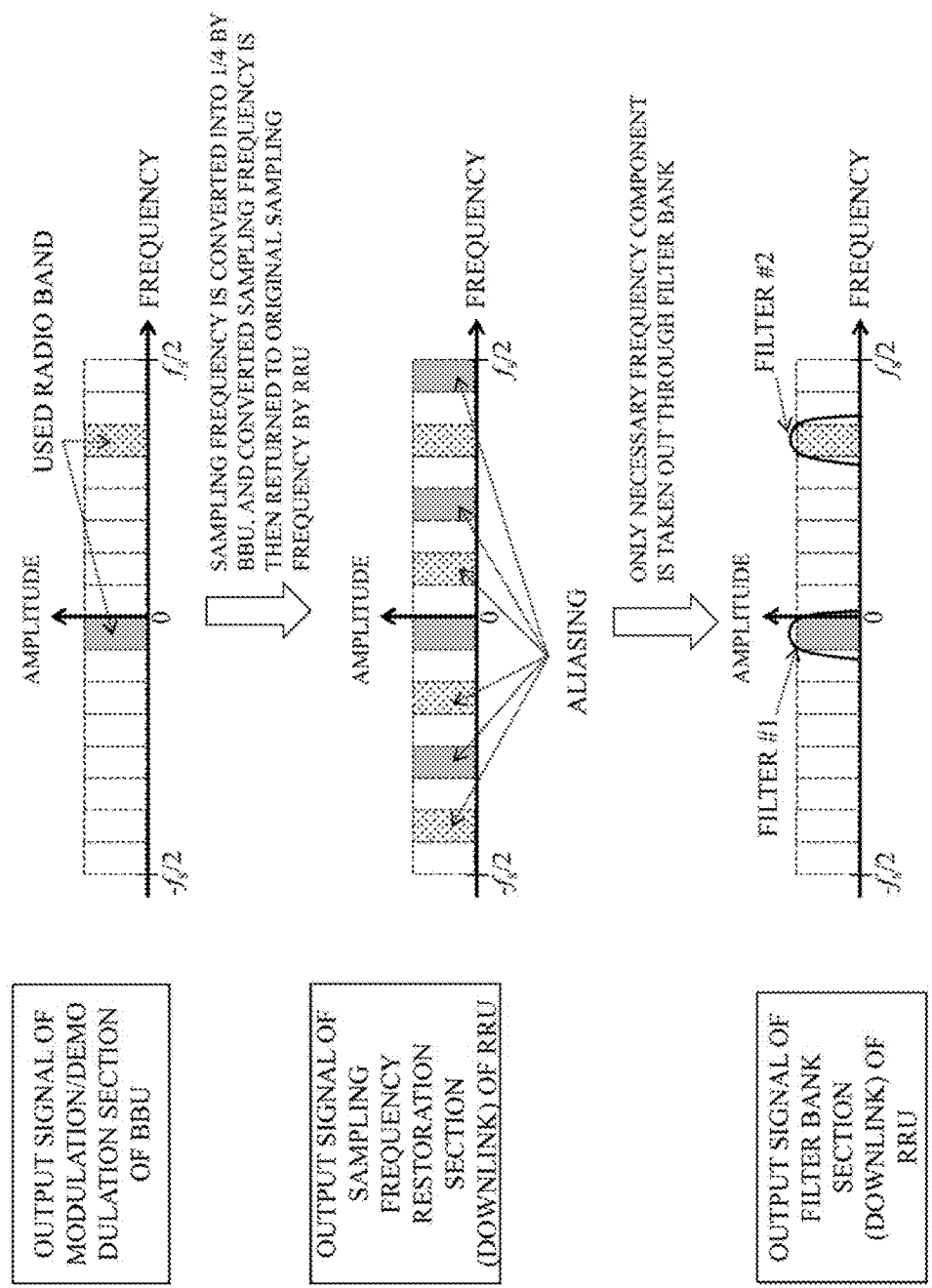
Figures 2, 3, 4, 5, 6, 7, 8, 9, 10, 11, 12, 13, 14:
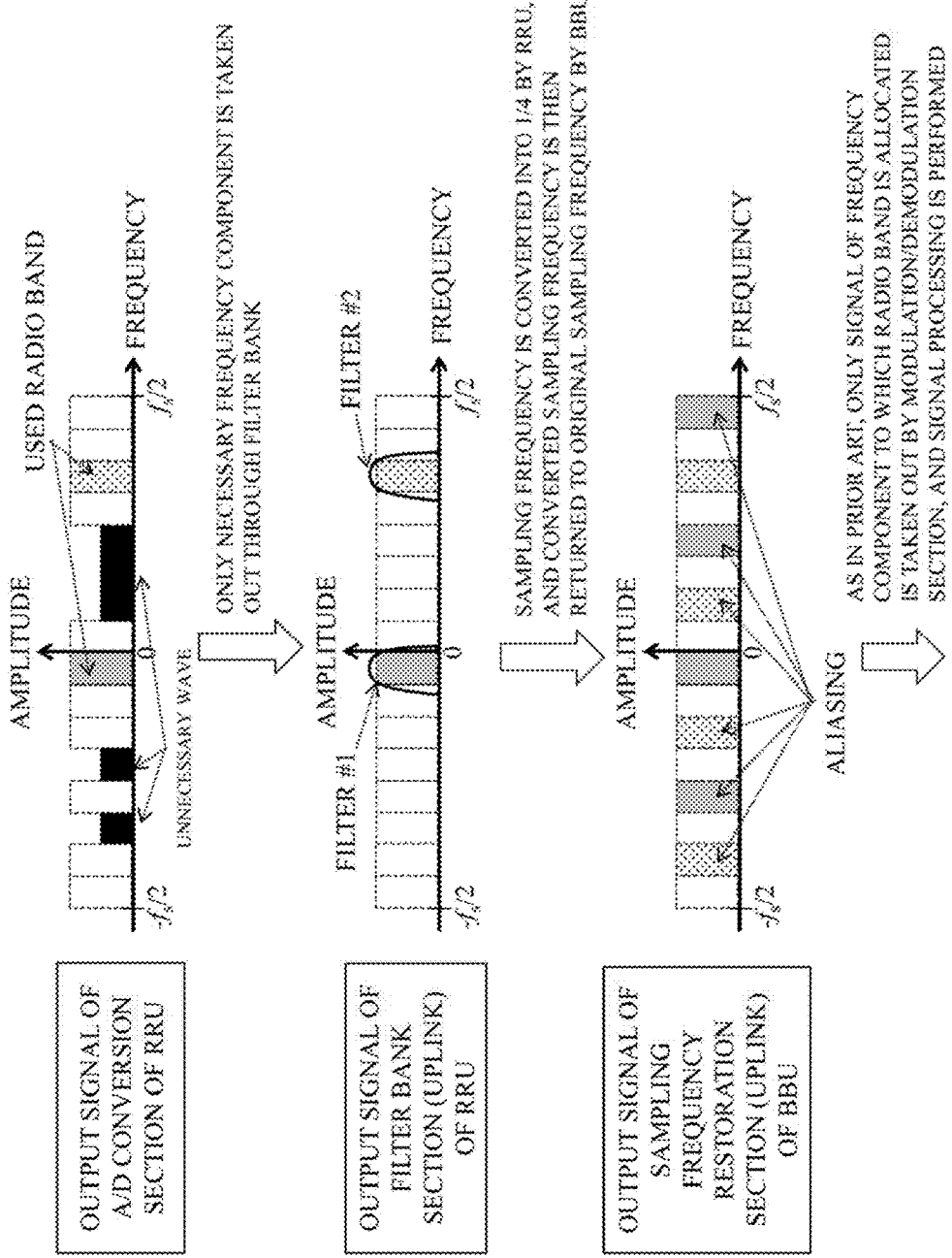
Figures 2, 3, 4, 5, 6, 7, 8, 9, 10, 11, 12, 13, 14, 15:
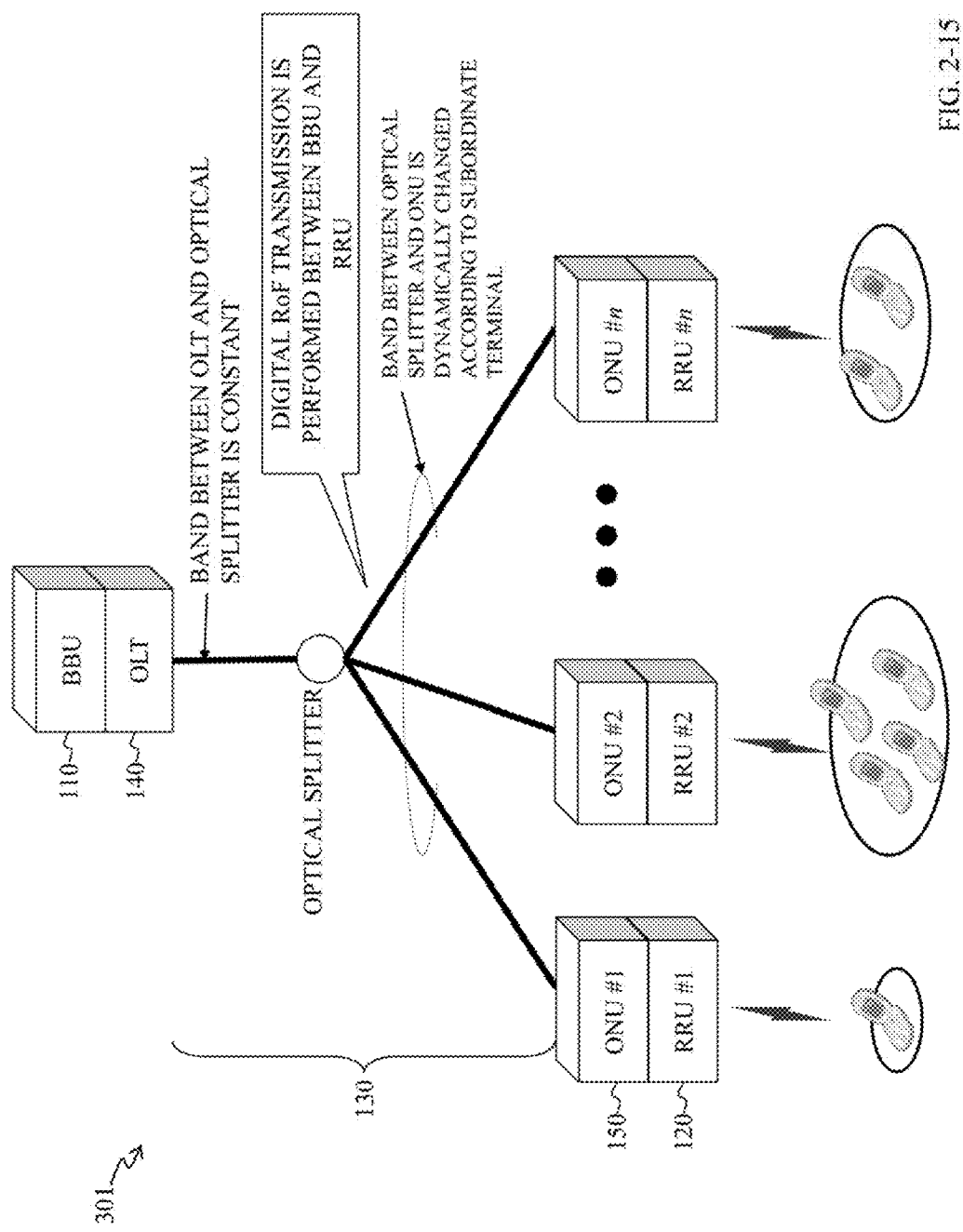
Figures 2, 3, 4, 5, 6, 7, 8, 9, 10, 11, 12, 13, 14, 15, 16:
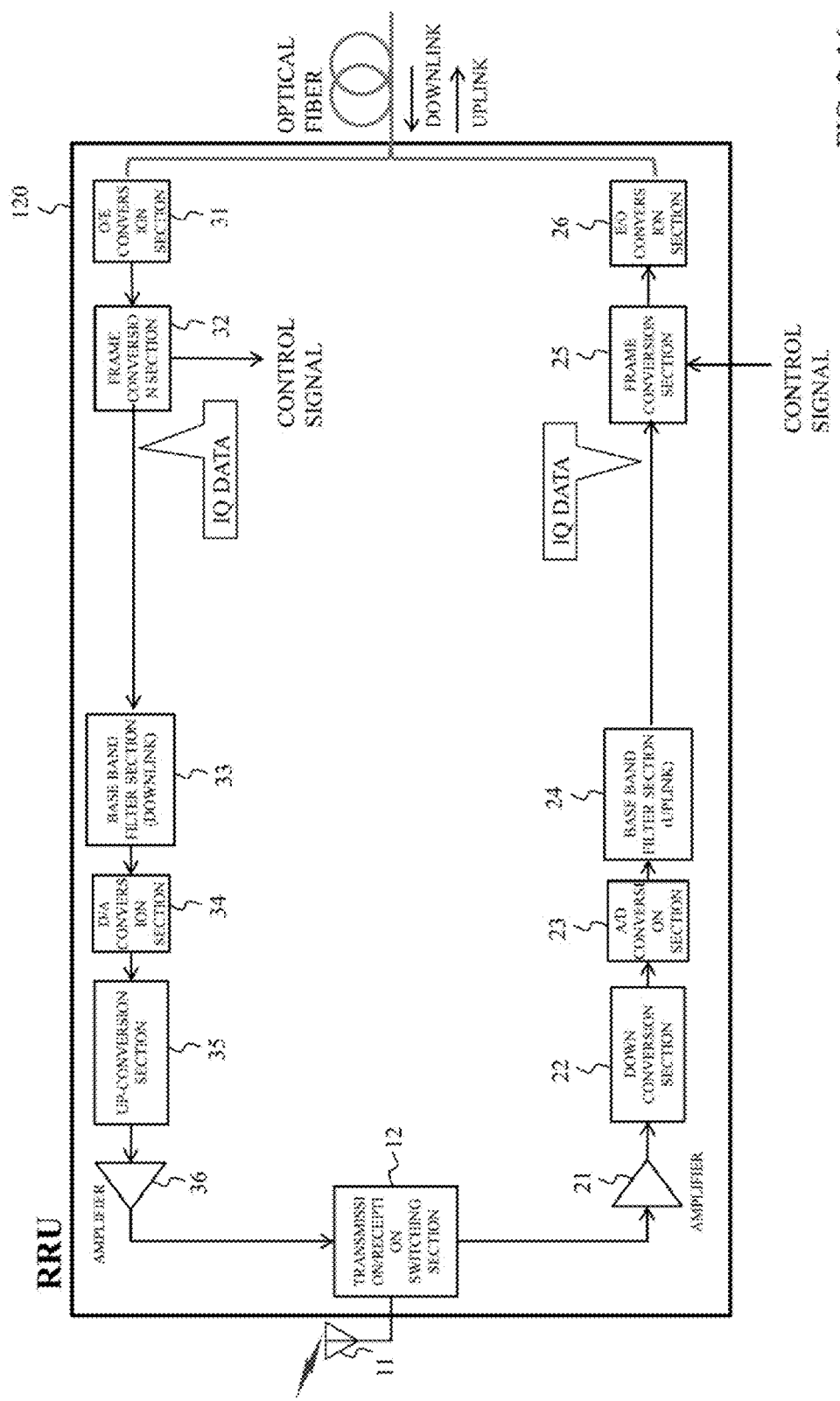
Figures 2, 3, 4, 5, 6, 7, 8, 9, 10, 11, 12, 13, 14, 15, 16, 17:
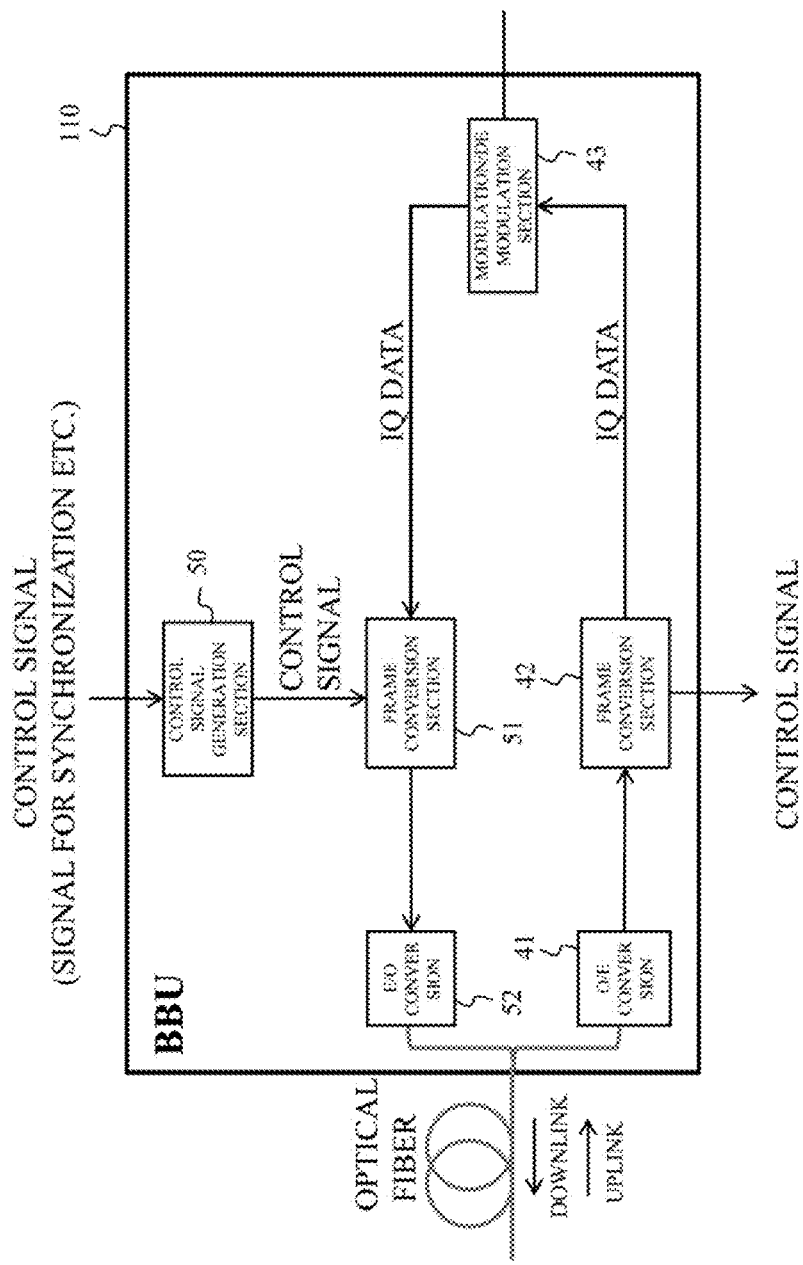
Figures 2, 3, 4, 5, 6, 7, 8, 9, 10, 11, 12, 13, 14, 15, 16, 17, 18:
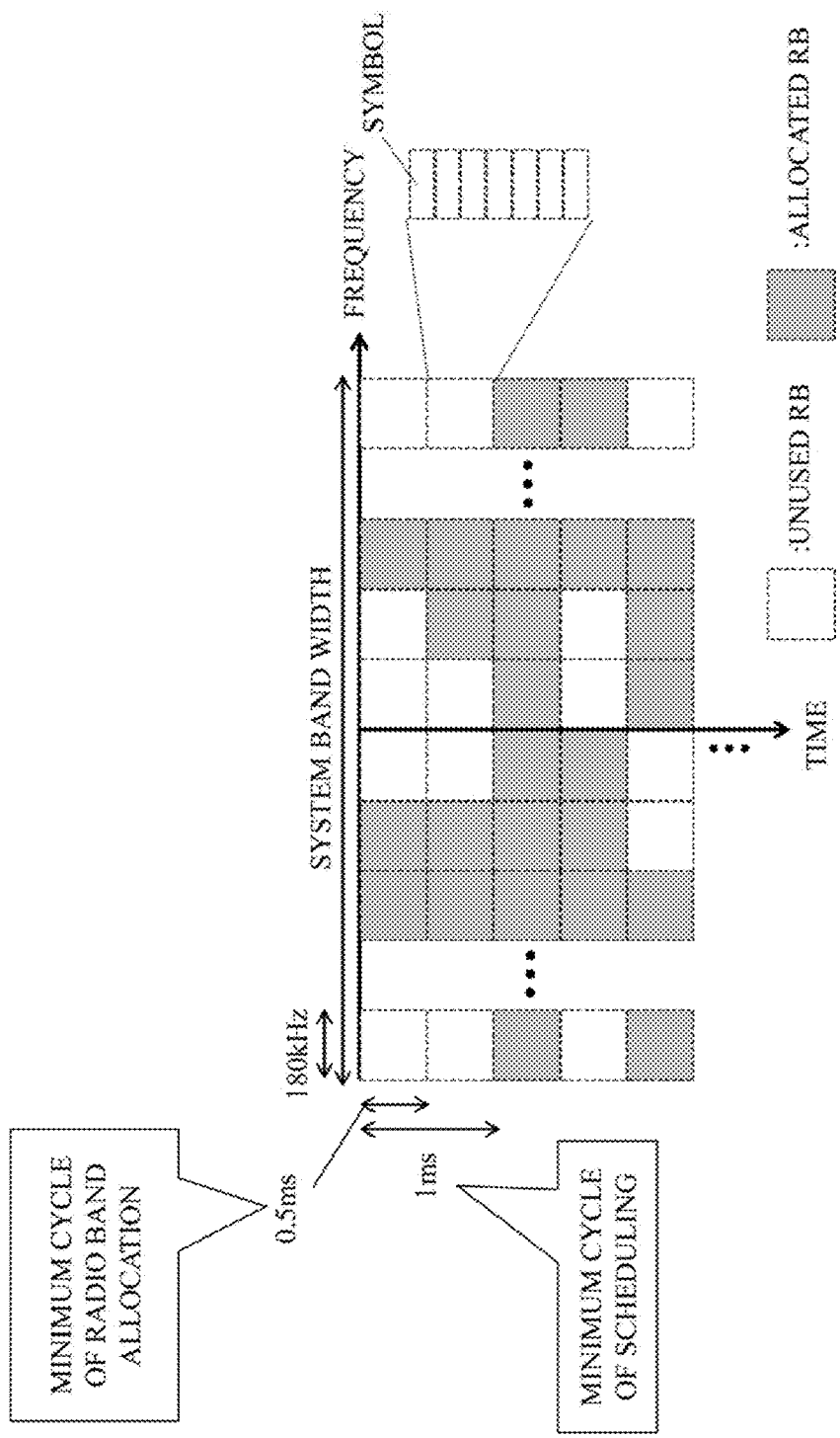
Figures 2, 3, 4, 5, 6, 7, 8, 9, 10, 11, 12, 13, 14, 15, 16, 17, 18, 19:
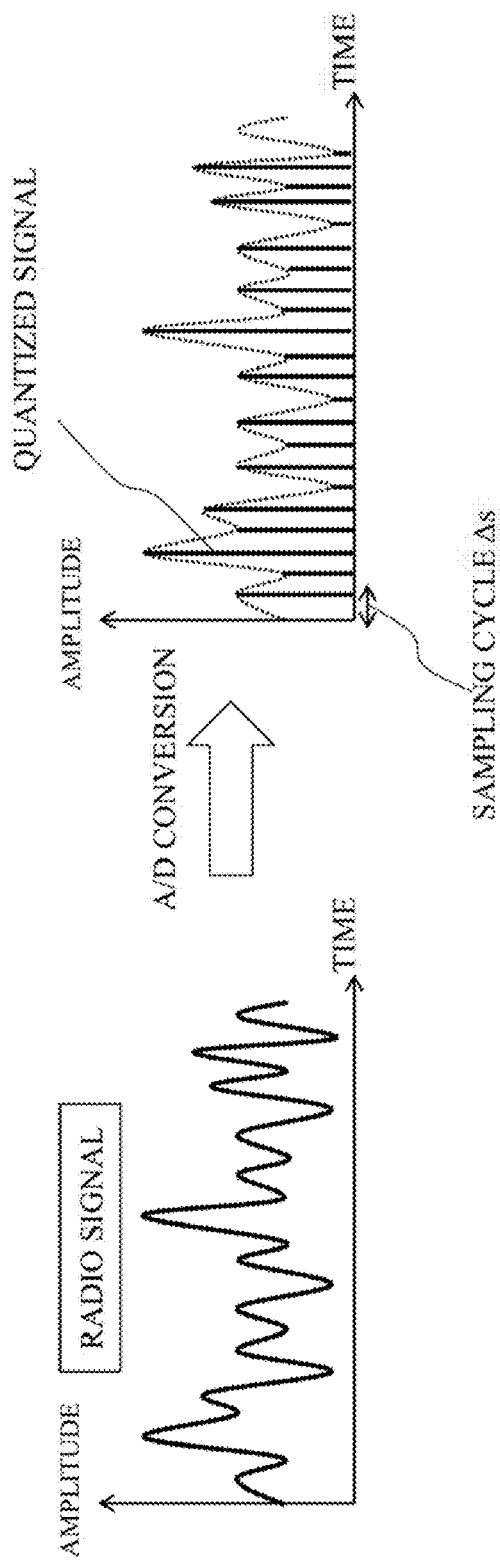
Figures 1, 3:
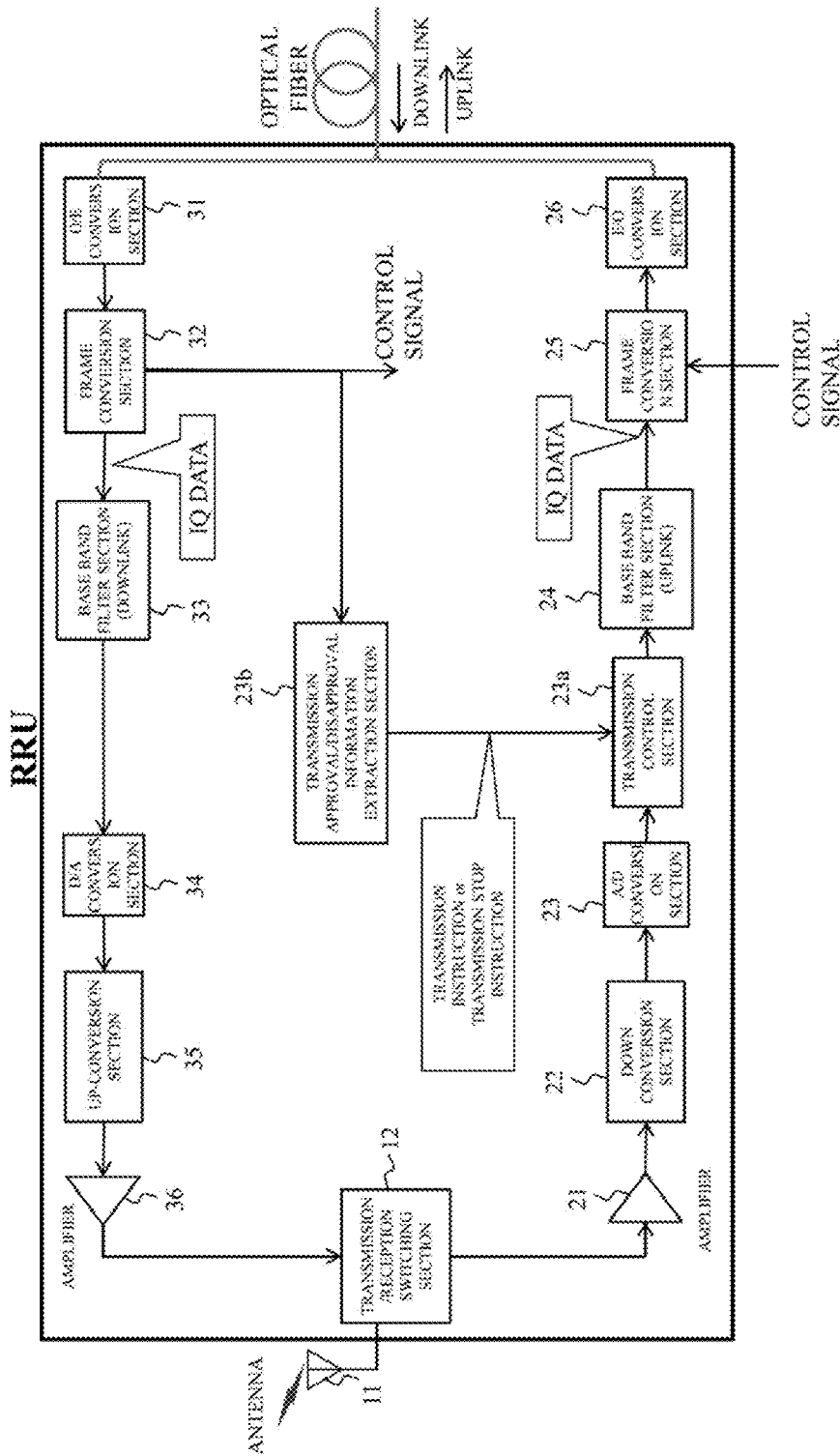
Figures 2, 3:
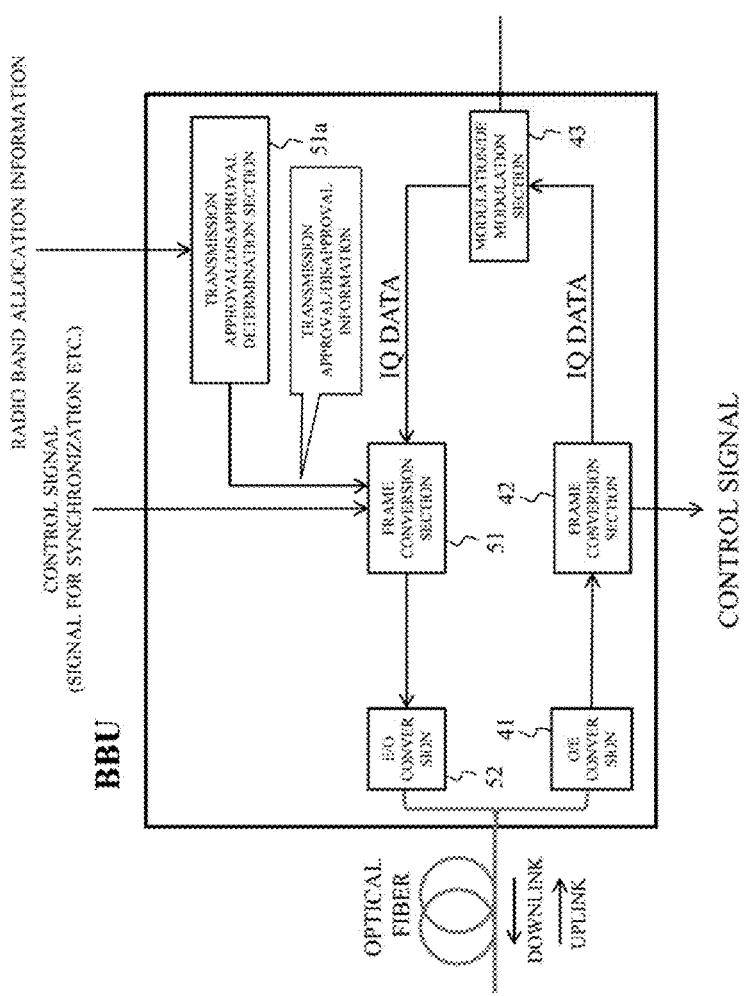
Figure 3:
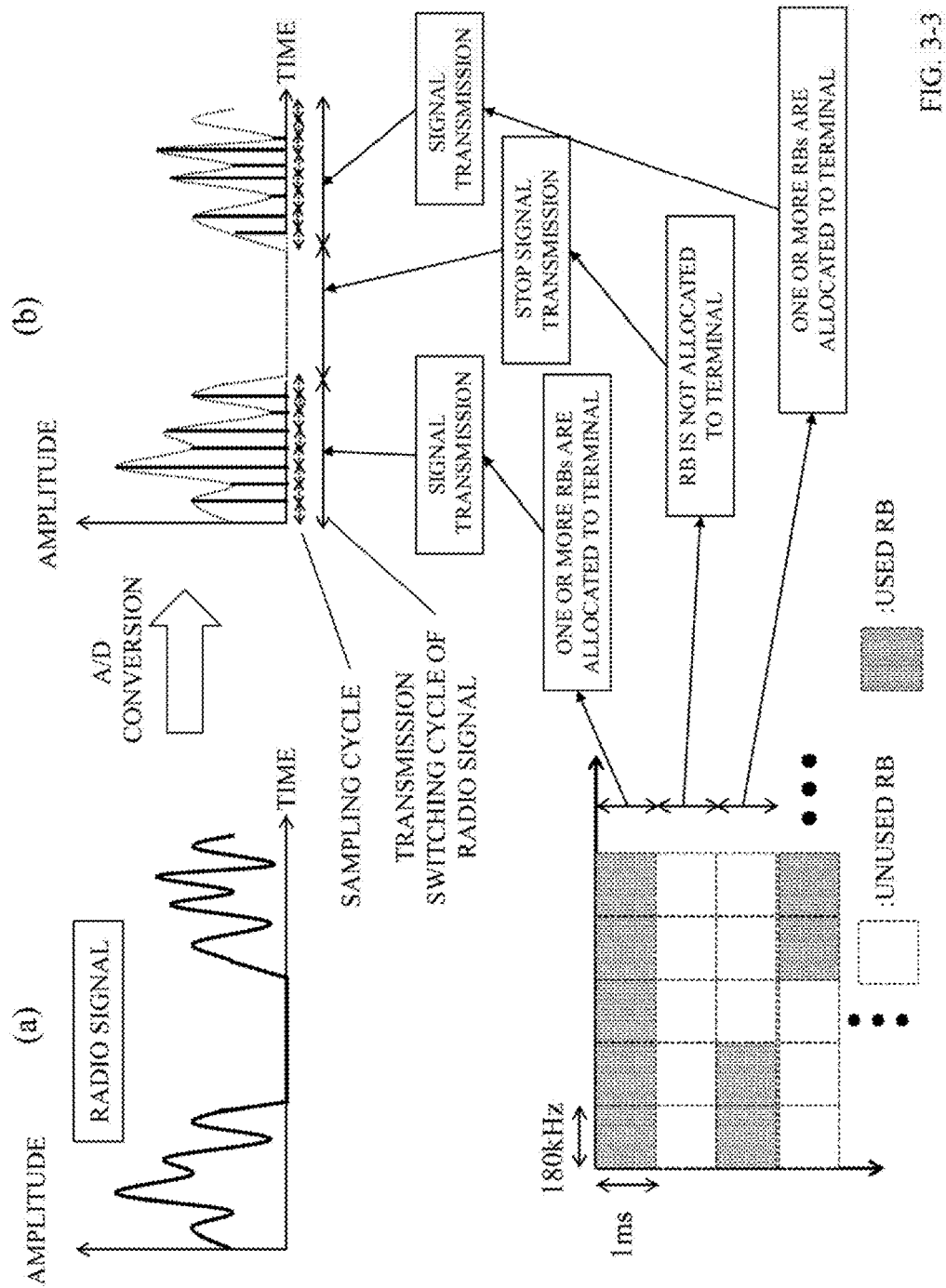
Figures 3, 4:
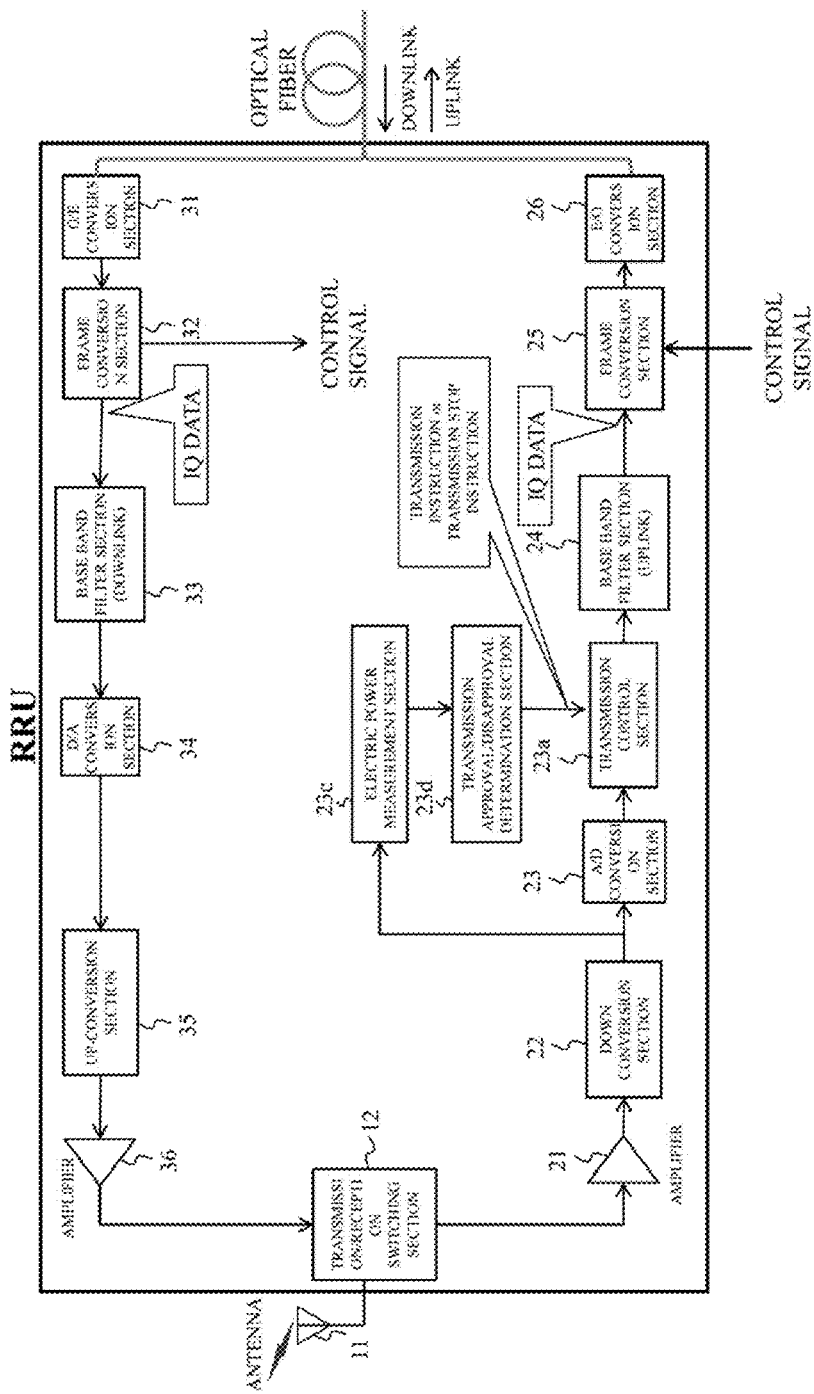
Figures 3, 4, 5:
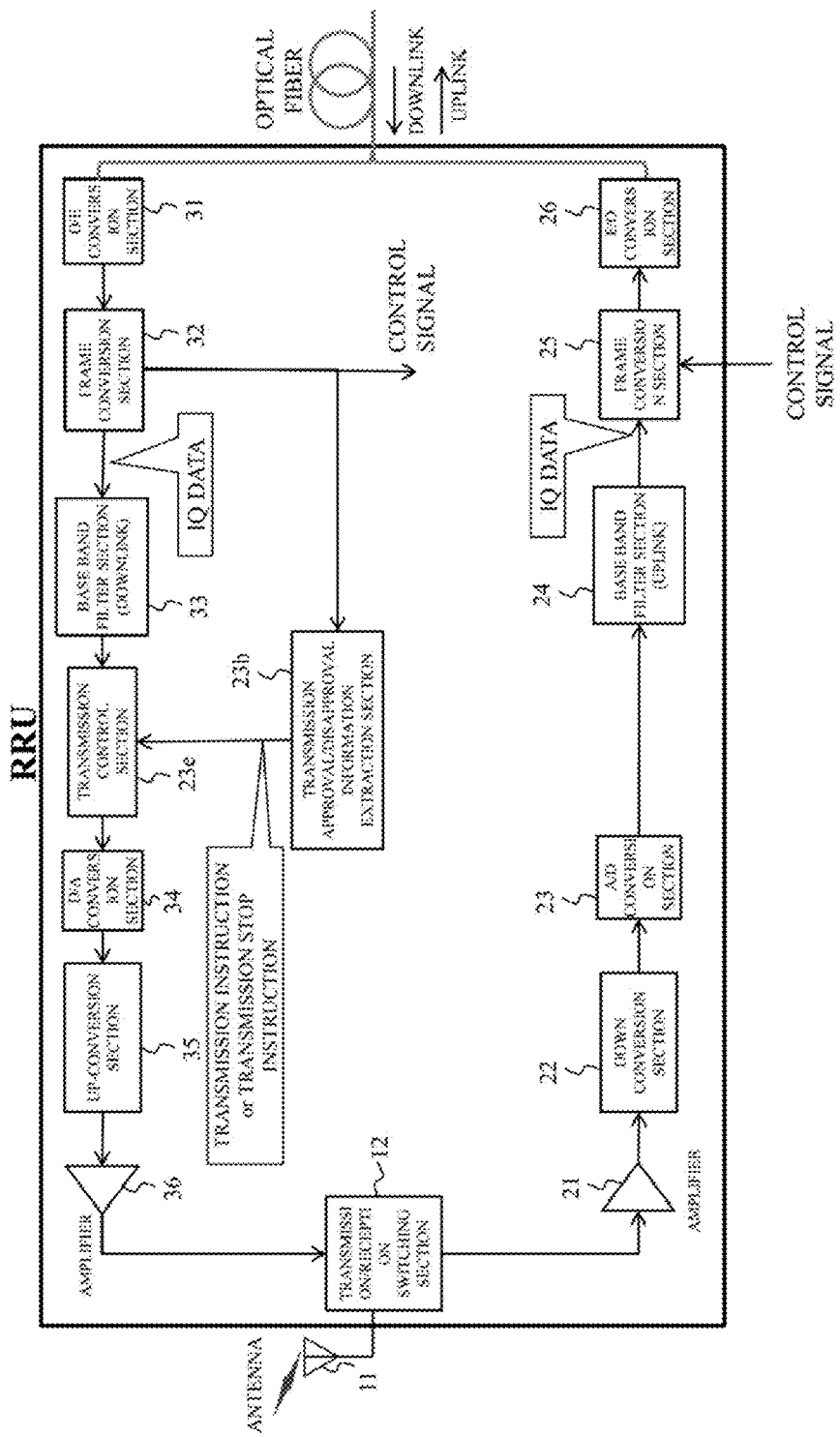
Figures 3, 4, 5, 6:
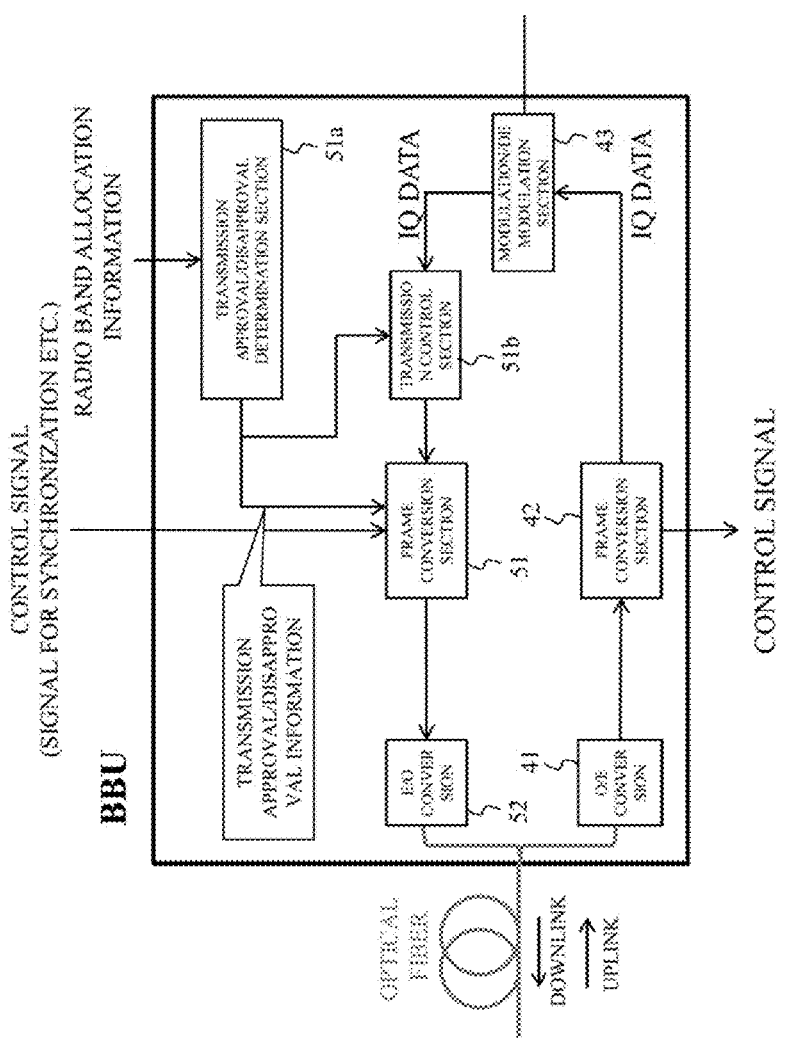

FIG. 2-3 shows an operational example of the RRU in the uplink in the application of the present disclosure. It is found that the sampling frequency $f_s$ fluctuates for each control cycle $t_{cyc}$. Here, $f_{sys,i}$ (i=1, 2, . . . ) represents a band width, and $f_{s,i}$ (i=1, 2, . . . ) represents a sampling frequency determined for each $f_{sys,i}$. Taking LTE and CPRI as examples, $f_{sys,1}$=20 MHz, $f_{sys,2}$=15 MHz, $f_{sys,3}$=10 MHz, $f_{s,1}$=30.72 MHz, $f_{s,2}$=23.04 MHz, $f_{s,3}$=15.36 MHz, and $t_{cyc}$=71.4 µs. In this embodiment, the sampling frequency $f_s$ is determined according to a range of an allocated radio band f. For example, as shown in FIG. 2-4, when the allocated radio band is within $f_{sys,2}$, the sampling frequency $f_s$ is set to $f_{s,2}$, and when the allocated radio band is within $f_{sys,3}$, the sampling frequency $f_s$ is set to $f_{s,3}$. The values of $f_{sys,i}$ and $f_{s,i}$ (i=1, 2, 3, . . . ) are set so that quality deterioration of a radio signal due to the practicing of the present disclosure is kept within an allowable value. The allowable value is a value described in Non Patent Literature 2, for example.

FIG. 2-5 shows an operational example of the downlink in the application of the present disclosure. In FIG. 2-5, the sampling frequency $f_s$ is set to ¼ by the sampling frequency (downlink) conversion section 216 of the BBU 110. Thus, when a signal in which $f_s$ is up-sampled to not less than 4 times by the sampling frequency (downlink) restoration section 211 of the RRU 120 and returned to an original value is expressed by a frequency region, a aliasing occurs. Thus, a aliasing noise is subjected to filtering processing by the base band filter section (downlink) 33 of the RRU 120, whereby only a desired signal component can be taken out.

FIG. 2-6 shows an operational example of the uplink in the application of the present disclosure. In FIG. 2-6, filtering processing is applied to a received radio signal by the base band filter section (uplink) 24 of the RRU 120, whereby a signal power of an unnecessary wave arriving from another cell is suppressed. After that, the sampling frequency $f_s$ is set to ¼ by the sampling frequency (uplink) conversion section 214 of the RRU 120, and transmission is performed. When a signal in which the sampling frequency $f_s$ is returned to an original value by the sampling frequency (uplink) restoration section 217 of the BBU 110 is expressed in the frequency region, the aliasing occurs; however, since a aliasing noise component and a desired signal component do not overlap, the desired signal component is taken out by the modulation/demodulation section 43 as in the related technique, and signal processing can be performed.

The sampling frequency (uplink) conversion section 214 of the RRU 120 may be provided at the post stage of the frame conversion section 25, and the sampling frequency (uplink) restoration section 217 of the BBU 110 may be provided at the preceding stage of the frame conversion section 42. Similarly, the sampling frequency (downlink) conversion section 216 of the BBU 110 may be provided at the post stage of the frame conversion section 51, and the sampling frequency (downlink) restoration section 211 of the RRU 120 may be provided at the preceding stage of the frame conversion section 32. Accordingly, an adapter is added without improving the existing BBU 110 or RRU 120, whereby the proposed method can be realized.

The function of the sampling frequency (downlink) restoration section 211 can be realized by the D/A conversion section 34. Namely, also when the D/A conversion section 34 momently changes the sampling frequency based on the radio band allocation information, the proposed method can be realized.

(Embodiment 2-2)

In Embodiment 2-1, the sampling frequency is changed according to a used frequency width of a radio band. In Embodiment 2-2, the sampling frequency is reduced in a range where the aliasing noise component does not deteriorate the signal quality of the desired signal component, so that the sampling frequency is reduced compared with Embodiment 2-1 to reduce a transmission information amount.

A device configuration example of the RRU in the application of the present disclosure is shown in FIG. 2-7. For the uplink signal processing, the RRU 120 has an antenna 11 which transmits/receives a radio signal, a transmission/ reception switching section 12 which switches transmission/reception, an amplifier 21 which amplifies a signal power of a received radio signal to electric power treatable in signal processing, a down-conversion section 22 which down-converts a radio signal, an A/D conversion section 23 which converts a down-converted analog signal into IQ data, a filter bank section (uplink) 224 which applies filtering processing to the IQ data, a sampling frequency conversion section (uplink) 214 which changes the sampling frequency $f_s$, a frame conversion section 25 which multiplexes the IQ data and a control signal, and an E/O conversion section 26 which converts an electrical signal into an optical signal and transmits the optical signal.

For the downlink signal processing, the RRU 120 has an O/E conversion section 31 which converts an optical signal received from the BBU 110 into an electrical signal, a frame conversion section 32 which takes out a control signal and IQ data from a received signal, a radio band allocation information (downlink) extraction section 212 and a radio band allocation information (uplink) extraction section 213 which each take out radio band allocation information from a control signal, a sampling frequency (downlink) determination section 221 and a sampling frequency (uplink) determination section 222 which each determine the sampling frequency $f_s$ to be set based on the taken out information, a sampling frequency (downlink) restoration section 211 which returns the sampling frequency $f_s$, converted in the BBU 110, to an original value, a filter bank section (downlink) 223 which applies filtering processing to the IQ data, a D/A conversion section 34 which converts the IQ data into an analog signal, an up-conversion section 35 which up-converts an analog signal, and an amplifier 36 which amplifies electric power of a radio signal.

The sampling frequency conversion is realized by, for example, puncturing data of an input bit sequence. Meanwhile, the sampling frequency (downlink) restoration section 211 is realized by, for example, complementing 0 to the data of the input bit sequence. Further, the sampling frequency conversion can be realized by down-sampling data while filtering the data through LPF (Low Pass Filter) using a decimation filter or by averaging or adding a plurality of bits to convert the bits into 1 bit, and, thus, to perform down-sampling.

FIGS. 2-8 and 2-9 show configuration examples of the filter bank section. In the filter bank section 223, such a filter coefficient that only a signal having a required frequency component is taken out is calculated by a filter coefficient determination section 2232 based on the radio band allocation information received from the radio band allocation information (downlink) extraction section 212, and the filter coefficient of each filter 2231 is changed. The same holds for the filter bank section 224.

Each configuration of the filter bank sections 223 and 224 is not limited to the above configuration, and a polyphase filter in which sampling frequency conversion/restoration and a filter are combined may be used. In the filter bank section, an input signal is converted into a signal in a frequency region by FFT and so on, the filtering processing is performed in the frequency region, and the signal may be returned to a signal in a time domain by IFFT and so on before output.

Unlike the related technique, the RRU 120 receives the radio band allocation information. The RRU 120 determines a value of the uplink sampling frequency $f_s$ to be set based on the information, changes $f_s$, derives a set value of $f_s$ of IQ data received in the downlink, and returns the value to an original value. The RRU 120 determines a filter coefficient so that only a desired signal component can be taken out based on the radio band allocation information and applies filtering processing to the IQ data.

A device configuration example of the BBU 110 in the application of the present disclosure is shown in FIG. 2-10. For the uplink signal processing, the BBU 110 has an O/E conversion section 41 which converts an optical signal into an electrical signal, a frame conversion section 42 which takes out a control signal and IQ data from a received signal, a sampling frequency (uplink) restoration section 217 which returns a sampling frequency $f_s$ of the IQ data changed by the RRU 120 to an original value, and a modulation/demodulation section 43 which demodulates the IQ data.

In the BBU 110, for the downlink signal processing, the BBU 110 has the modulation/demodulation section 43 which outputs the IQ data of a modulation signal, a sampling frequency (uplink, downlink) determination section 215 which determines uplink and downlink sampling frequencies $f_s$ based on uplink and downlink radio band allocation information, a control signal generation section 50 which generates a control signal by multiplexing the radio band allocation information and other control information, a sampling frequency (downlink) conversion section 216 which converts the sampling frequency $f_s$ of the IQ data into the value determined by the sampling frequency (uplink, downlink) determination section 215, a frame conversion section 51 which multiplexes the IQ data and the control signal, and an E/O conversion section 52 which converts an electrical signal into an optical signal and transmits the optical signal.

This embodiment is different from the related technique in that the BBU 110 determines and changes such a minimum sampling frequency $f_s$ in the downlink that signal quality deterioration given to the desired signal component by the aliasing noise component is not more than an allowable value based on the radio band allocation information (downlink). When the sampling frequency is reduced and restored, if the aliasing component overlaps the desired signal component, the signal quality of the desired signal component is deteriorated; however, when a frequency interval between the aliasing component and the desired signal component is large to some extent, the signal quality deterioration hardly occurs. The allowable value is the value described in the Non Patent Literature 2, for example. A value obtained by providing a margin with respect to the allowable value may be used as the allowable value in the practicing of the present disclosure. The BBU 110 derives a changed value of the sampling frequency $f_s$ of the IQ data received by the RRU 120 based on the radio band allocation information (uplink) and returns $f_s$ to an original value. As the control information, the radio band allocation information is transmitted to the RRU 120.

FIG. 2-11 shows an operational example of the RRU 120 in the uplink in the application of the present disclosure. It is found that the sampling frequency $f_s$ fluctuates for each control cycle $t_{cyc}$. Here, $f_{s,i}$ (i=1, 2, . . . ) represents a usable sampling frequency. Taking LTE and CPRI as examples, $f_{s,1}$=30.72 MHz, $f_{s,2}$=23.04 MHz, $f_{s,3}$=15.36 MHz, $f_{s,4}$=7.68 MHz, . . . and $t_{cyc}$=71.4 μs. In this embodiment, candidates of the sampling frequency as shown in FIG. 2-12 are provided, and in the sampling frequency determination section 222, such a minimum sampling frequency $f_s$ that the signal quality deterioration given to the desired signal component by the aliasing noise component is not more than an allowable value is obtained from $f_{s,i}$ and changed. The candidates of the sampling frequency to be converted are not limited to the values.

The sampling frequency $f_s$ determined in the BBU 110 and the RRU 120 are arbitrary values. The sampling frequency may be determined in a range where the aliasing noise component and the desired signal component do not overlap, or the sampling frequency may be determined so that the aliasing noise component and the desired signal component are separated from each other at a frequency interval of not less than $f_{th}$. Here, it is assumed that the aliasing noise component and the desired signal component are separated from each other at a frequency interval $f_t$. Although a filter has a passband, a transition band, and a stopband, in the case where the desired signal component is taken out by the filtering processing, when the frequency band width in the transition band is not more than $f_t$, electric power of a aliasing noise component can be suppressed in the stopband. When the frequency band width in the transition band is not less than $f_t$, the electric power of the aliasing noise component is not suppressed but included in the desired signal component taken out by the filtering processing. Accordingly, considering $f_t$ of the filter, $f_{th}$ may be determined so that the desired signal component is not deteriorated.

FIG. 2-13 shows an operational example of the downlink in the application of the present disclosure. In FIG. 2-13, $f_s$ is set to ¼ by the sampling frequency (downlink) conversion section 216 of the BBU 110. Thus, when a signal in which $f_s$ is up-sampled to not less than 4 times by the sampling frequency (downlink) restoration section 211 of the RRU 120 and returned to an original value is expressed by a frequency region, a aliasing occurs. Thus, the aliasing noise is subjected to filtering processing by a filter bank section 233 (downlink) of the RRU 120, whereby only a desired signal component can be taken out.

FIG. 2-14 shows an operational example of the uplink in the application of the present disclosure. In FIG. 2-14, filtering processing is applied to a received radio signal by a filter bank section (uplink) 224 of the RRU 120, whereby a signal power of an unnecessary wave is suppressed. After that, $f_s$ is set to ¼ by the sampling frequency (uplink) conversion section 214 of the RRU 120, and transmission is performed. When a signal in which $f_s$ is up-sampled to not less than 4 times by the sampling frequency (uplink) restoration section 217 of the BBU 110 and returned to an original value is expressed in the frequency region, the aliasing occurs; however, since a aliasing noise component and a desired signal component do not overlap, the desired signal component is taken out by the modulation/demodulation section 43 as in the related technique, and signal processing can be performed.

An adapter is added without improving the existing BBU or RRU, whereby the proposed method can be realized.

The function of the sampling frequency conversion section can be realized by the D/A conversion section. Namely, also when the D/A conversion section momently changes the sampling frequency based on the radio band allocation information, the proposed method can be realized.

(Embodiment 3)

A distributed radio communication base station system of this embodiment is a distributed radio communication base station system in which a function of a base station transmitting and receiving a radio signal to and from a radio terminal is divided into BBU and RRU, and the distributed radio communication base station system is provided with an optical fiber connecting the BBU and the RRU and performing RoF transmission between the BBU and the RRU with an optical signal and a transmission approval/disapproval function of detecting a no signal section of a transmission signal to be RoF transmitted through the optical fiber and stopping the RoF transmission in the no signal section.

RRU 120 according to this embodiment is provided with a transmission control section 23a and a transmission control section 23e instead of the compression section 82 an the expansion section 81 described in Embodiment 1. BBU according to this embodiment is provided with a frame conversion section 51 and a frame conversion section 42 instead of the compression section 83 and the expansion section 84 described in Embodiment 1.

(Embodiment 3-1)

When the BBU 110 and the plurality of RRUs 120 are connected through a PON system 130 as shown in FIG. 2-15, the distributed radio communication base station system of this embodiment is provided with the PON system 130 which connects the single BBU 110 and the plurality of RRUs 120 and performs RoF transmission between the BBU and the RRU with an optical signal, an OLT function 140 which is provided on the BBU side of the PON system 130, mutually converts a signal format treated in the BBU 110 and a signal format transmittable in the PON system 130, and controls a transmission timing avoiding collision of optical signals in the PON system 130, and an ONU function 150 which is provided on the RRU side of the PON system 130, mutually converts a signal format treated in the RRU 120 and the signal format transmittable in the PON system 130, and transmits an uplink optical signal at a timing designated by the OLT function 140.

For example, when considering the case where a TDM-PON system such as GE-PON (IEEE 802.3 ah) and 10G-EPON (IEEE 802.3 av) is applied as the PON system 130, the OLT function 140 includes a function of mapping IQ data, output from the BBU 110 in a downlink, to an Ethernet (registered trademark) frame and transmitting the data at a predetermined timing and a function of extracting the IQ data from the Ethernet (registered trademark) frame received in an uplink. Meanwhile, the ONU function 150 includes a function of extracting IQ data from the Ethernet (registered trademark) frame received in the downlink and a function of mapping the IQ data, output from the RRU 120 in the uplink, to the Ethernet (registered trademark) frame and transmitting the data at a predetermined timing.

In FIG. 2-15, although the distributed radio communication base station system in which the BBU 110 has the OLT function 140, and the RRU 120 has the ONU function 150 has been described, this embodiment may be practiced using the existing BBU/RRU/OLT/ONU. In this case, between the BBU 110 and the OLT 140 and between the RRU 120 and the ONU 150 are each connected by an adapter (not shown), and the OLT and the ONU are connected by the PON system 130.

The function of the adapter between the BBU and the OLT includes a function of converting a downlink optical signal output from the BBU 110 into a signal having a format capable of being recognized by an input interface of the OLT 140 and a function of converting an uplink signal output from the OLT 140 into an optical signal having a format capable of being recognized by an input interface of the BBU 110.

Meanwhile, the function of the adapter between the ONU and the RRU includes a function of converting a downlink signal output from the ONU 150 into an optical signal having a format capable of being recognized by an input interface of the RRU 120 and a function of converting an uplink optical signal output from the RRU 120 into a signal having a format capable of being recognized by an input interface of the ONU 150.

In this embodiment, a no signal section of an uplink is detected from radio band allocation information. Thus, in the transmission approval/disapproval function, a base station detects the no signal section of a transmission signal from the RRU to the BBU, based on the radio band information set in communication with a radio terminal, and the BBU instructs to stop the RoF transmission in the no signal section to the RRU.

The BBU confirms the radio band allocation information, and when a radio band of the uplink is not allocated in a certain time section, the BBU judges that the time section is the no signal section and gives a transmission stop instruction in this section to the RRU to reduce a data information amount transmitted from the RRU to the BBU.

FIG. 3-1 is a view for explaining a device configuration example of the RRU of the distributed radio communication base station system of this embodiment.

For the uplink, the RRU has an antenna 11 which transmits/receives a radio signal, a transmission/reception switching section 12 which switches a transmission/reception signal, an amplifier 21 which amplifies a signal power of a received radio signal to electric power treatable in signal processing, a down-conversion section 22 which down-converts a radio signal into a base band, an A/D conversion section 23 which converts a down-converted analog signal into IQ data, a transmission control section 23a which controls output of the IQ data according to an input transmission instruction or transmission stop instruction, a base band filter section (uplink) 24 which applies filtering processing to the IQ data, a frame conversion section 25 which multiplexes the IQ data and a control signal between the BBU and the RRU, and an E/O conversion section 26 which converts an electrical signal into an optical signal and transmits the optical signal.

For the downlink, the RRU has an O/E conversion section 31 which converts an optical signal received from the BBU into an electrical signal, a frame conversion section 32 which takes out a control signal and IQ data from a received signal, a transmission approval/disapproval information extraction section 23b which extracts transmission approval/disapproval information from the control signal, a base band filter section (downlink) 33 which applies filtering processing to the IQ data, a D/A conversion section 34 which converts the IQ data into an analog signal, an up-conversion section 35 which up-converts an analog signal, and an amplifier 36 which amplifies electric power of a radio signal. The transmission control section 23a and the transmission approval/disapproval information extraction section 23b are included in the transmission approval/disapproval function on the RRU side.

The RRU of this embodiment is different from the RRU of the related technique in that the RRU controls whether or not an uplink signal is transmitted based on the transmission approval/disapproval information included in the control signal between the BBU and the RRU received from the BBU. Namely, the uplink band can be controlled on the BBU side.

FIG. 3-2 is a view for explaining a device configuration example of the BBU of the distributed radio communication base station system of this embodiment. The uplink configuration of the BBU is the same as that of the related technique.

For the downlink, the BBU has a modulation/demodulation section 43 which outputs IQ data of a modulation signal, a transmission approval/disapproval determination section 51a which judges whether or not an uplink radio signal is required to be transmitted from the RRU to the BBU, based on the radio band allocation information in the uplink scheduled in the BBU, a frame conversion section 51 which multiplexes the determined transmission approval/disapproval information, the IQ data, and the control signal between the BBU and the RRU, and an E/O conversion section 52 which converts an electrical signal into an optical signal and transmits the optical signal. The transmission approval/disapproval determination section 51a is included in the transmission approval/disapproval function on the BBU side.

The BBU of this embodiment is different from the BBU of the related technique in that the BBU transmits the transmission approval/disapproval information to the RRU based on the radio band allocation information. For example, the transmission approval/disapproval determination section 51a judges as transmission disapproval in a time section in which there is no radio band allocated to a terminal in the uplink and judges as transmission approval in other time sections.

FIG. 3-3 is a view for explaining operation of the distributed radio communication base station system of this embodiment. FIG. 3-3(a) is an image of a radio signal arriving from a radio terminal to the RRU. FIG. 3-3(b) is an image obtained when the radio signal is A/D converted by the A/D conversion section 23. As shown in those images, there is a time (no signal section) when the radio signal does not arrive from the radio terminal. The RRU recognizes existence of the no signal section based on the transmission approval/disapproval information transmitted from the BBU and stops transmission of digital data during the relevant time. Thus, the RRU stops signal transmission in the time section in which the radio band is not allocated to the radio terminal.

In the transmission approval/disapproval function on the reception side, in upstream communication, the frame conversion section 42 of the BBU replaces digital data during a time when signal transmission stops with a succession of zero bits, whereby the no signal section can be restored in a transmission signal.

In this embodiment, although the configuration in which the BBU is provided with the transmission approval/disapproval determination section 51a, and the RRU extracts the transmission approval/disapproval information from the transmission approval/disapproval determination section 51a is described, the RRU is provided with the transmission approval/disapproval determination section, the BBU transmits the radio band allocation information to the RRU, and the transmission approval/disapproval may be judged on the RRU side.

(Embodiment 3-2)

In this embodiment, the RRU detects the no signal section in the uplink. Namely, the transmission approval/disapproval function detects the no signal section of a transmission signal on the transmission side.

The RRU measures a power value of a radio signal received by an antenna, and when the power value is not more than a threshold value, the RRU judges that there is no radio signal and does not transmit a signal to the BBU. This embodiment is different from Embodiment 3-1, and the transmission approval/disapproval instruction is not required to be transmitted from the BBU to the RRU.

The BBU of this embodiment has the same configuration as the BBU of FIG. 2-17.

FIG. 3-4 is a view for explaining a device configuration example of the RRU of the distributed radio communication base station system of this embodiment. The downlink configuration of the RRU is the same as that of the related technique.

For the uplink, the RRU has an antenna 11 which transmits/receives a radio signal, a transmission/reception switching section 12 which switches transmission/reception, an amplifier 21 which amplifies a signal power of a received radio signal to electric power treatable in signal processing, a down-conversion section 22 which down-converts a radio signal into a base band, an A/D conversion section 23 which converts a down-converted analog signal into IQ data, electric power measurement section 23c which measures electric power from the down-converted signal, a transmission approval/disapproval determination section 23d which issues a transmission stop instruction or a transmission instruction based on a power value measured by the electric power measurement section 23c, a transmission control section 23a which controls output of the IQ data according to an input transmission instruction or transmission stop instruction, a base band filter section (uplink) 24 which applies filtering processing to the IQ data, a frame conversion section 25 which multiplexes the IQ data and a control signal between the BBU and the RRU, and an E/O conversion section 26 which converts an electrical signal into an optical signal and transmits the optical signal. The transmission control section 23a, the electric power measurement section 23c, and the transmission approval/disapproval determination section 23d are included in the transmission approval/disapproval function of this embodiment.

The RRU of this embodiment is different from the RRU of the related technique in that transmission control is performed according to a power value of a received radio signal. For example, the transmission approval/disapproval determination section 23c compares a measured power value with a threshold value, issues the transmission stop instruction when the measured power value is not more than the threshold value, and issues the transmission instruction when the measured power value is not less than the threshold value. The electric power measurement section 23d may utilize a circuit of radio equipment measuring Received Signal Strength Indication (RSSI), for example.

The transmission control section 23a may not be disposed at the position in FIG. 3-4 but disposed at the post stage of the base band filter section (uplink) 24 or at the post stage of the frame conversion section 25.

The function of the transmission control section 23a can be realized by the D/A conversion section 23. Namely, sampling is not performed only at the time point when the D/A conversion section 23 receives the transmission stop instruction, whereby transmission stop in the no signal section can be realized.

A control cycle of the transmission approval/disapproval function may be arbitrarily set. Taking an LTE system as an example, the control may be performed for each symbol cycle, for each 0.5 ms according to RB, or for each 1 ms according to a scheduling cycle.

(Embodiment 3-3)

In this embodiment, the BBU detects the no signal section of the downlink. Namely, the transmission approval/disapproval function detects the no signal section of the transmission signal on the transmission side.

The BBU confirms radio band allocation information, and when the radio band of the downlink is not allocated in a certain time section, the BBU judges that the time section is the no signal section and stops transmission of the IQ data output from the modulation/demodulation section.

FIG. 3-6 is a view for explaining a device configuration example of the BBU of the distributed radio communication base station system of this embodiment. The uplink configuration of the BBU is the same as that of the related technique.

For the downlink, the BBU has a modulation/demodulation section 43 which outputs IQ data of a modulation signal, a transmission approval/disapproval determination section 51a which judges whether or not an uplink radio signal is required to be transmitted from the RRU to the BBU, based on the radio band allocation information in the uplink scheduled in the BBU, a transmission control section 51b which controls output of IQ data according to an input transmission instruction or transmission stop instruction (transmission approval/disapproval information), a frame conversion section 51 which multiplexes the determined transmission approval/disapproval information, the IQ data, and the control signal between the BBU and the RRU, and an E/O conversion section 52 which converts an electrical signal into an optical signal and transmits the optical signal. The transmission approval/disapproval determination section 51a and the transmission control sections 51b are included in the transmission approval/disapproval function. In FIG. 3-6, although the BBU transmits the transmission approval/disapproval information to the RRU, the transmission approval/disapproval information may not be transmitted to the RRU. In this case, the transmission approval/disapproval determination section 51a does not output the transmission approval/disapproval information to the frame conversion section 51.

The BBU of this embodiment is different from the BBU of the related technique in that the BBU permits or stops the transmission of the IQ data based on the radio band allocation information. For example, the transmission approval/disapproval determination section 51a judges as transmission disapproval in a time section in which there is no radio band allocated to a radio terminal in the downlink and judges as transmission approval in other time sections. When the BBU issues the transmission stop instruction in the time section, a data information amount transmitted from the BBU to the RRU can be reduced.

When the BBU does not transmit the transmission approval/disapproval information to the RRU, the RRU of this embodiment has the same configuration as the RRU of FIG. 2-16. Meanwhile, when the BBU transmits the transmission approval/disapproval information to the RRU, the RRU of this embodiment has the configuration of FIG. 3-5. The uplink configuration of the RRU of FIG. 3-5 is the same as that of the related technique.

For the downlink, the RRU has an O/E conversion section 31 which converts an optical signal received from the BBU into an electrical signal, a frame conversion section 32 which takes out a control signal and IQ data from a received signal, a transmission approval/disapproval information extraction section 23b which extracts transmission approval/disapproval information from the control signal, a base band filter section (downlink) 33 which applies filtering processing to the IQ data, a transmission control section 23e which controls output of the IQ data according to a transmission instruction or a transmission stop instruction input from the transmission approval/disapproval information extraction section 23b, a D/A conversion section 34 which converts the IQ data into an analog signal, an up-conversion section 35 which up-converts an analog signal, and an amplifier 36 which amplifies electric power of a radio signal.

The RRU of this embodiment is different from the RRU of the related technique in that the RRU controls whether or not a radio signal is transmitted to a radio terminal based on the transmission approval/disapproval information included in the control signal between the BBU and the RRU received from the BBU. When the signal from the BBU is stopped, unnecessary radio output to a radio terminal can be prevented. In the transmission approval/disapproval function on the reception side, in downstream communication, the transmission control section 23e replaces digital data during a time when signal transmission stops with a succession of zero bits, whereby the no signal section can be restored in a transmission signal.

(Embodiment 3-4)

In Embodiment 3-3, the BBU performs control of stopping a downlink signal based on the radio band allocation information. In this embodiment, BBU determines whether or not there is a radio signal based on the IQ data output from the modulation/demodulation section 43, and when there is no radio signal, the BBU performs control of stopping the downlink signal. For example, the transmission approval/disapproval determination section 51a confirms a bit sequence of the IQ data and can determine presence/absence of the radio signal based on a length of continuation of bit values 0.

(Other Embodiments)

The BBU may have the transmission control function in the downlink, or the OLT may have the transmission control function. Alternatively, the above-described adaptor added between the BBU and the OLT may have the transmission control function.

The RRU may have the transmission control function in the uplink, or the ONU may have the transmission control function. Alternatively, the above-described adaptor added between the RRU and the ONU may have the transmission control function.

Hereinafter, a summary of the distributed radio communication base station system of the present embodiment will be shown.

<Problem>

In the related technique, although there is no radio terminal belonging to the RRU, a fixed amount of information is always transmitted between the BBU and the RRU, and therefore, this translates into an increase in the information amount between the RRU and the BBU.

<Solution>

The BBU or the RRU stops data transmission according to an allocation situation of a radio band, whereby the data information amount transmitted between the BBU and the RRU can be reduced.

<Effect>

In the present disclosure, since the data information amount transmitted between the BBU and the RRU can be reduced according to the allocation situation of the radio band, a band required between the BBU and the RRU can be reduced, and the transmission band utilization efficiency between the BBU and the RRU can be enhanced.

The present disclosure is not limited to the disclosures according to the above respective embodiments. For example, the configurations of Embodiments 1 and 2 or 3 may be combined, the configurations of Embodiments 1, 2, and 3 may be combined, or the configurations of Embodiments 2 and 3 may be combined. When Embodiments 2 and 3 are combined, a transmission signal detection function of determining whether or not there is a transmission signal is provided, and when there is the transmission signal, the sampling frequency is changed according to the allocation situation of the radio signal, and when there is no transmission signal, the RoF transmission in the no signal section is stopped. When the disclosures of Embodiments 2 and 3 are combined, the band between the BBU and the RRU can be more effectively utilized.

INDUSTRIAL APPLICABILITY

The present disclosure can be applied to information and communication industry.

REFERENCE SIGNS LIST (Explanation of Indicia in Embodiments 1-1 to 1-4)
11: antenna
12: transmission/reception switching section
21: amplifier
22: down-conversion section
23: A/D conversion section
24: base band filter section (uplink)
25: frame conversion section
26: E/O conversion section
31: O/E conversion section
32: frame conversion section
33: base band filter section (downlink)
34: D/A conversion section
35: up-conversion section
36: amplifier
41: O/E conversion section
42: frame conversion section
43: modulation/demodulation section
51: frame conversion section
52: E/O conversion section
61: Ethernet (registered trademark) frame conversion section
62: Ethernet (registered trademark) frame conversion section
63: buffer
64: transmission timing control section
65: E/O conversion section
66: O/E conversion section
71: Ethernet (registered trademark) frame conversion section
72: transmission timing determination section
73: transmission timing control section
74: buffer
75: Ethernet (registered trademark) frame conversion section
76: O/E conversion section
77: E/O conversion section
81: expansion section
82: compression section
83: compression section
84: expansion section
110: BBU
120: RRU
130: PON system
140: OLT function
150: ONU function
210: first adapter
220: OLT
230: second adapter
240: ONU
301, 302: distributed radio communication base station system (Explanation of Indicia in Embodiments 2-1 to 2-2)
11: antenna
31: O/E conversion section
32: frame conversion section
33: base band filter section (downlink)
34: D/A conversion section
35: up-conversion section
36: amplifier
12: transmission/reception switching section
21: amplifier
22: down-conversion section
23: A/D conversion section
24: base band filter section (uplink)
25: frame conversion section
43: modulation/demodulation section
50: control signal generation section
51: frame conversion section
52: E/O conversion section
41: O/E conversion section
42: frame conversion section
110: BBU
120: RRU
130: PON system
140: OLT
150: ONU
211: sampling frequency (downlink) restoration section
212: sampling frequency information (downlink) extraction section
213: sampling frequency information (uplink) extraction section
214: sampling frequency (uplink) conversion section
215: sampling frequency (uplink, downlink) determination section
216: sampling frequency (downlink) conversion section
217: sampling frequency (uplink) restoration section
221: sampling frequency (downlink) determination section
222: sampling frequency (uplink) determination section
223: filter bank section (downlink)
224: filter bank section (uplink)
301: distributed radio communication base station system
2231, 2241: filter
2232, 2242: filter coefficient determination section
(Explanation of Indicia in Embodiments 3-1 to 3-4)
11: antenna
12: transmission/reception switching section
21: amplifier
22: down-conversion section
23: A/D conversion section
23a: transmission control section
23b: transmission approval/disapproval information extraction section
23c: electric power measurement section
23d: transmission approval/disapproval determination section
23e: transmission control section
24: base band filter section (uplink)
25: frame conversion section
26: E/O conversion section
31: O/E conversion section
32: frame conversion section
33: base band filter section (downlink)
34: D/A conversion section
35: up-conversion section
36: amplifier
41: O/E conversion section
42: frame conversion section
43: modulation/demodulation section
51: frame conversion section
51a: transmission approval/disapproval determination section
51b: transmission control section
52: E/O conversion section
101: portable terminal
110: BBU
120: RRU
130: PON system
301: distributed radio communication base station system

What is claimed is:

1. A distributed radio communication base station system comprising:
a base band unit (BBU);
a remote radio unit (RRU); and
an optical fiber connecting the BBU and the RRU,
wherein one of the BBU and the RRU comprises a sampling frequency conversion section, wherein a sampling frequency of an optical signal is converted from a predetermined value to a reduced value RoF signal according to an allocated band of the radio signal, and transmitted through the optical fiber, and wherein the other of the BBU and the RRU comprises a sampling frequency restoration section, wherein the sampling frequency is restored to the predetermined value when the reduced value RoF signal is received through the optical fiber and an aliasing noise generated in the restoration of the sampling frequency is removed.

2. The distributed radio communication base station system according to claim 1, wherein the sampling frequency conversion section reduces the sampling frequency to the sampling frequency in a range where signal quality deterioration given to the radio signal by the aliasing noise is not more than an allowable value.

3. The distributed radio communication base station system according to claim 1, wherein the conversion section has a transmission approval/disapproval function of detecting a no signal section of the reduced value RoF signal transmitted through the optical fiber and stopping the reduced value RoF transmission in the no signal section.

4. The distributed radio communication base station system according to claim 3, wherein the transmission approval/disapproval function restores the reduced value RoF transmission when the transmitted signal is again started to be received through the optical fiber.

5. The distributed radio communication base station system according to claim 3, wherein in the transmission approval/disapproval function, the base station system detects the no signal section of the transmitted signal from the RRU to the BBU based on radio band information set in communication with a radio terminal, and the BBU instructs the RRU to stop the reduced value RoF transmission in the no signal section.

6. A base band unit (BBU) of a distributed radio communication base station system, wherein the BBU comprises:
a sampling frequency conversion section, wherein a sampling frequency of an optical signal is converted from a predetermined value to a reduced value RoF signal according to an allocated band of the radio signal, and transmitted through an optical fiber that connects the BBU and a remote radio unit (RRU); and
a sampling frequency restoration section, wherein the sampling frequency is restored to the predetermined value when the reduced value RoF signal is received through the optical fiber and an aliasing noise generated in the restoration of the sampling frequency is removed.

7. A remote radio unit (RRU) of a distributed radio communication base station system, wherein the RRU comprises:
- a sampling frequency conversion section, wherein a sampling frequency of an optical signal is converted from a predetermined value to a reduced value RoF signal according to an allocated band of the radio signal, and transmitted through an optical fiber that connects the RRU and a base band unit (BBU); and
- a sampling frequency restoration section, wherein the sampling frequency is restored to the predetermined value when the reduced value RoF signal is received through the optical fiber and an aliasing noise generated in the restoration of the sampling frequency is removed.

8. A method for operating a distributed radio communication base station system, wherein the system comprises:
- a base band unit (BBU);
- a remote radio unit (RRU); and
- an optical fiber connecting the BBU and the RRU, the method comprising:
  - using a sampling frequency converter section to reduce a sampling frequency of an RoF signal that is transmitted through the optical fiber from a predetermined value according to an allocated band of a radio signal at one of the BBU and RRU;
  - receiving the reduced sampling frequency RoF signal through the optical fiber at the other of the BBU and RRU;
  - using a sampling frequency restorer section to restore the sampling frequency to the predetermined value at the other of the BBU and RRU; and
  - removing an aliasing noise generated in the restoration of the sampling frequency to the predetermined value at the other of the BBU and RRU.

9. The method for operating a distributed radio communication base station system according to claim 8, further comprising stopping a reduced value RoF transmission when a no signal section in the reduced value RoF signal transmitted through the optical fiber is detected at the other of the BBU and RRU.

10. The distributed radio communication base station system according to claim 2, wherein one of the BBU and RRU has a transmission approval/disapproval function that detects a no signal section of a signal transmitted through the optical fiber and stops the reduced value RoF transmission in the no signal section.

11. The distributed radio communication base station system according to claim 4, wherein the reduced value RoF signal is transmitted from the RRU to the BBU, the BBU detects the no signal section of the reduced value RoF signal transmitted from the RRU to the BBU based on radio band information set in communication with a radio terminal, and the BBU instructs the RRU to stop RoF transmission in the no signal section.

12. The distributed radio communication base station system according to claim 1, wherein the sampling frequency conversion section reduces the sampling frequency to a range wherein the aliasing noise component and the desired signal component do not overlap.

13. A base band unit (BBU) of a distributed radio communication base station system according to claim 6, wherein the sampling frequency conversion section reduces the sampling frequency to a range wherein the aliasing noise component and the desired signal component do not overlap.

14. A remote radio unit (RRU) of a distributed radio communication base station system, according to claim 7, wherein the sampling frequency conversion section reduces the sampling frequency to a range wherein the aliasing noise component and the desired signal component do not overlap.

15. The method for operating a distributed radio communication base station system according to claim 8, wherein the sampling frequency is reduced to a range wherein the aliasing noise component and the desired signal component do not overlap.

16. The distributed radio communication base station system according to claim 1, wherein the sampling frequency conversion section reduces the sampling frequency to one fourth, further comprising a filter to remove aliasing noise to obtain a desired signal component.

17. A base band unit (BBU) of a distributed radio communication base station system according to claim 6, wherein the sampling frequency conversion section reduces the sampling frequency to one fourth, further comprising a filter to remove aliasing noise to obtain a desired signal component.

18. A remote radio unit (RRU) of a distributed radio communication base station system, according to claim 7, wherein the sampling frequency conversion section reduces the sampling frequency to one fourth, further comprising a filter to remove aliasing noise to obtain a desired signal component.

19. The method for operating a distributed radio communication base station system according to claim 8, wherein the sampling frequency is reduced to one fourth, further comprising a filter to remove aliasing noise to obtain a desired signal component.

20. A base band unit (BBU) of a distributed radio communication base station system according to claim 6, wherein the sampling frequency conversion section reduces the sampling frequency to the sampling frequency in a range where signal quality deterioration given to the radio signal by the aliasing noise is not more than an allowable value.

21. A remote radio unit (RRU) of a distributed radio communication base station system according to claim 7, wherein the sampling frequency conversion section reduces the sampling frequency to the sampling frequency in a range where signal quality deterioration given to the radio signal by the aliasing noise is not more than an allowable value.

* * * * *